(12) United States Patent
Simplicio, Jr. et al.

(10) Patent No.: US 12,519,661 B2
(45) Date of Patent: ***Jan. 6, 2026

(54) CRYPTOGRAPHIC METHODS AND SYSTEMS USING ACTIVATION CODES FOR DIGITAL CERTIFICATE REVOCATION

(71) Applicants: LG ELECTRONICS, INC., Seoul (KR); UNIVERSITY OF SÃO PAULO, São Paulo (BR)

(72) Inventors: Marcos A. Simplicio, Jr., São Paulo (BR); Eduardo Lopes Cominetti, São Paulo (BR); Harsh Kupwade Patil, Fremont, CA (US); Jefferson B. Ricardini, São Paulo (BR); Marcos Vinicius M. Silva, São Paulo (BR)

(73) Assignees: LG ELECTRONICS, INC., Seoul (KR); UNIVERSITY OF SAO PAULO, Sao Paulo (BR)

(*) Notice: Subject to any disclaimer, the term of this patent is extended or adjusted under 35 U.S.C. 154(b) by 0 days.

This patent is subject to a terminal disclaimer.

(21) Appl. No.: 18/423,173

(22) Filed: Jan. 25, 2024

(65) Prior Publication Data

US 2024/0243928 A1    Jul. 18, 2024

Related U.S. Application Data

(63) Continuation of application No. 17/529,580, filed on Nov. 18, 2021, now Pat. No. 11,895,250, which is a
(Continued)

(51) Int. Cl.
*H04L 9/32* (2006.01)
*H04L 9/08* (2006.01)

(52) U.S. Cl.
CPC .......... *H04L 9/3268* (2013.01); *H04L 9/0861* (2013.01); *H04L 9/0894* (2013.01); *H04L 2209/42* (2013.01)

(58) Field of Classification Search
CPC .... H04L 9/3268; H04L 9/0861; H04L 9/0894
See application file for complete search history.

(56) References Cited

U.S. PATENT DOCUMENTS 10,771,265 B2    9/2020    Simplicio, Jr. et al.
11,184,180 B2    11/2021    Simplicio, Jr. et al.
(Continued)

FOREIGN PATENT DOCUMENTS

EP    2905925 A1    8/2015

OTHER PUBLICATIONS

Kumar et al. (Binary Hash Tree based Certificate Access Management, WiSec 2017, 27 pages) (Year: 2017).*
(Continued)

*Primary Examiner* — Oleg Korsak
(74) *Attorney, Agent, or Firm* — Duane Morris LLP

(57) ABSTRACT

To revoke a digital certificate, activation of the digital certificate is blocked by withholding an activation code from the certificate user. The certificates are generated by a plurality of entities in a robust process that preserves user privacy (e.g. anonymity) even in case of collusion of some of the entities. The process is suitable for connected vehicles, e.g. as an improvement for Security Credential Management System (SCMS).

24 Claims, 16 Drawing Sheets

Related U.S. Application Data continuation of application No. 16/245,181, filed on Jan. 10, 2019, now Pat. No. 11,190,363.

(60) Provisional application No. 62/626,672, filed on Feb. 5, 2018, provisional application No. 62/616,418, filed on Jan. 11, 2018.

(56) References Cited

U.S. PATENT DOCUMENTS

| | | |
|---|---|---|
| 11,190,363 B2 | 11/2021 | Simplicio, Jr. et al. |
| 11,895,250 B2* | 2/2024 | Simplicio ............. H04L 9/0894 |
| 2019/0245703 A1* | 8/2019 | Simplicio Junior, Jr. ................... H04L 9/3268 |
| 2022/0158853 A1* | 5/2022 | Simplicio ............. H04L 9/0861 |

OTHER PUBLICATIONS

Whyte et al. (A Security Credential Management System for V2V Communications, IEEE, 2013, 8 pages) (Year: 2013).*

* cited by examiner

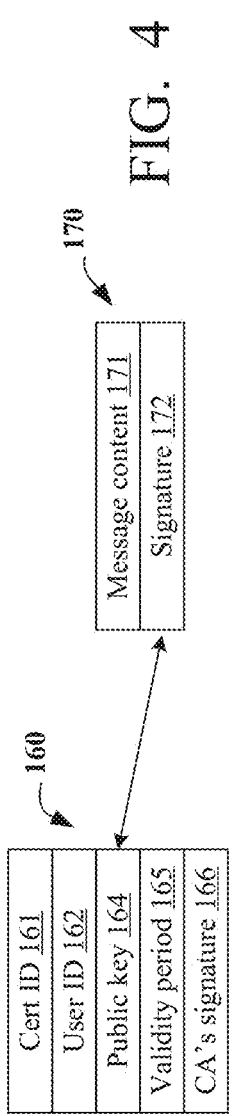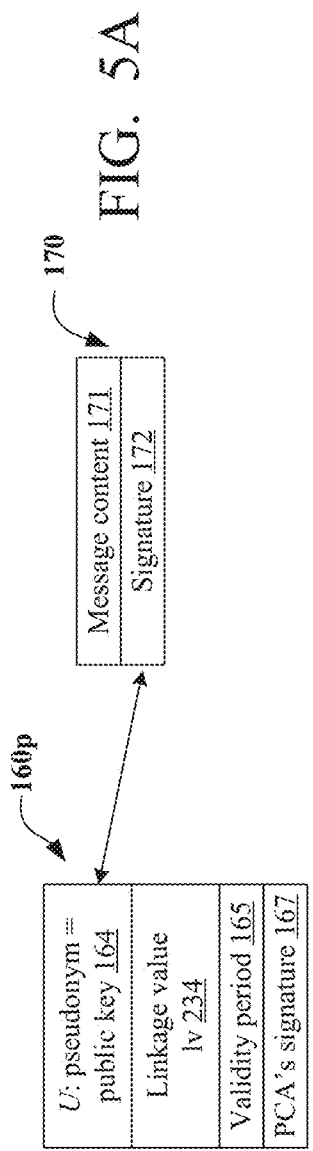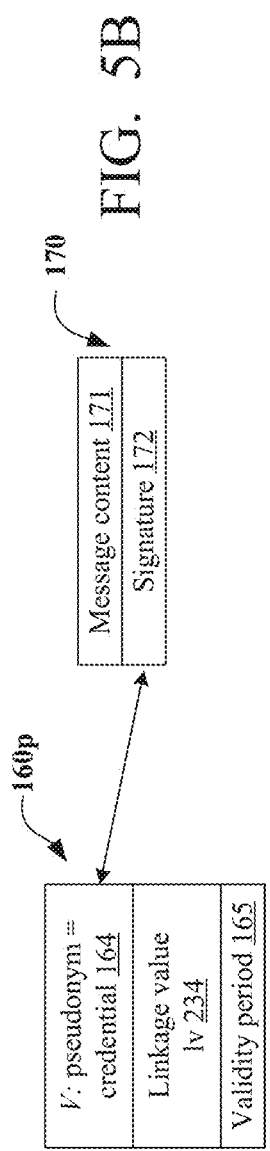

ID
CRYPTOGRAPHIC METHODS AND SYSTEMS USING ACTIVATION CODES FOR DIGITAL CERTIFICATE REVOCATION

CROSS REFERENCE TO RELATED APPLICATIONS

This patent application is a continuation application of and claims priority to U.S. patent application Ser. No. 16/245,181, filed Jan. 10, 2019 and entitled "CRYPTOGRAPHIC METHODS AND SYSTEMS USING ACTIVATION CODES FOR DIGITAL CERTIFICATE REVOCATION," and further claims priority to U.S. Provisional Patent Application No. 62/616,418, "EFFICIENT GENERATION AND DISTRIBUTION OF ACTIVATION CODES FOR PSEUDONYM CERTIFICATES," filed on 11 Jan. 2018, incorporated herein by reference; and to U.S. Provisional Patent Application No. 62/626,672, "METHOD FOR EFFICIENT AND SECURE REVOCATION OF PSEUDONYM CERTIFICATES USING ACTIVATION CODES," filed on 5 Feb. 2018, incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to secure communications, including transportation-related communications among cars, trucks, trains, and possibly other vehicles, as well as pedestrians' smartphones, traffic lights, and other infrastructure.

In recent times, there has been a surge in digital technologies embedded in physical objects, leading to what is today known as Internet of Things (IOT). This trend has also reached the automotive industry, which has shown a growing interest in exploring interaction models such as Vehicle-to-Vehicle (V2V), Vehicle-to-Infrastructure (V2I) and Vehicle-to-Pedestrian (V2P), collectively referred to as Vehicle-to-Everything (V2X) communications. V2X enables several applications aimed at improving transportation safety, efficiency, and human to machine interaction. For example, with V2X, vehicles can exchange or communicate information (e.g., for velocity, direction and brake status) that can help drivers keep a safe distance from other vehicles while maintaining a suitable speed.

Indeed, the U.S. Department of Transportation has initiated a "connected vehicles" program "to test and evaluate technology that will enable cars, buses, trucks, trains, roads and other infrastructure, and our smartphones and other devices to 'talk' to one another. Cars on the highway, for example, would use short-range radio signals to communicate with each other so every vehicle on the road would be aware of where other nearby vehicles are. Drivers would receive notifications and alerts of dangerous situations, such as someone about to run a red light as they [are] nearing an intersection or an oncoming car, out of sight beyond a curve, swerving into their lane to avoid an object on the road." U.S. Department of Transportation at https://www.its.dot.gov/cv_basics/cv_basics_what.htm. "Connected vehicles could dramatically reduce the number of fatalities and serious injuries caused by accidents on our roads and highways. [They] also promise to increase transportation options and reduce travel times. Traffic managers will be able to control the flow of traffic more easily with the advanced communications data available and prevent or lessen developing congestion. This could have a significant impact on the environment by helping to cut fuel consumption and reduce emissions."

While V2X technology and connected vehicles offer the promise of increased safety, traffic flow, efficiency, etc., the large scale deployment of such technologies also requires addressing some challenges, especially security and privacy concerns. In particular, V2X architectures are expected to (1) ensure that messages exchanged between vehicles are legitimate, banning misbehaving users, while (2) preserving the anonymity of honest users, so their movements cannot be easily tracked by other vehicles or by the system itself.

Ensuring that the messages exchanged between vehicles are legitimate, a vehicle may digitally sign each message using the vehicle's private key. The message recipient can verify the signature using the sending vehicle's public key. The public keys themselves are authenticated by means of digital certificates which certify that a given public key belongs to a given vehicle. The certificates are distributed by trusted computer entities called Certificate Authorities (CAs). Each certificate is signed by the CA, allowing the message recipient to confirm the certificate's authenticity by verifying the CAs signature.

If the vehicle misbehaves, the vehicle's certificate should be revoked. Therefore, a trusted entity periodically distributes a certificate revocation list (CRL) identifying the revoked certificates. The CRL size however is directly proportional to the number of the revoked certificates, and can be large, especially since a single vehicle may have multiple certificates corresponding to different validity periods. Further, a vehicle may have multiple certificates corresponding to the same validity period to make the vehicle difficult to trace by a malicious person, and this further increases the CRL size.

To reduce the CRL size, the certificate revocation can use activation codes. When a vehicle receives a certificate, the vehicle cannot decrypt the certificate without an activation code. However, the activation code for each certificate is provided to the vehicle only shortly before the certificate's validity period. See, for example, E. Verheul, "Activate later certificates for V2X—combining ITS efficiency with privacy," Cryptology ePrint Archive, Report 2016/1158, 2016, http://eprint.iacr.org/2016/1158; and V. Kumar, J. Petit, and W. Whyte, "Binary hash tree based certificate access management for connected vehicles," in Proc. of the 10th ACM Conference on Security and Privacy in Wireless and Mobile Networks, ser. WiSec'17. New York, NY, USA: ACM, 2017, pp. 145-155; both incorporated herein by reference. To increase the efficiency of the certificate generation process, the certificates are generated in batch, possibly long in advance of their respective validity periods, but if a certificate is revoked it does not have to be included in the CRL if the activation code has not been issued. The CRL size is therefore reduced.

It is desirable to reduce the computation costs and the network bandwidth in provisioning and activating the certificates. Further, the use of certificates is complicated by the need to ensure that a dishonest, or "honest but curious", certificate management entities cannot easily compromise the system even if they collude. It is desirable to reduce the security risks presented by the certificate management entities.

SUMMARY

This section summarizes some features of the invention. Other features may be described in the subsequent sections. The invention is defined by the appended claims, which are incorporated into this section by reference.

Some embodiments of the present disclosure provide certificate management techniques using activation codes. Some of the existing certificate management systems can be retrofitted to use the activation code techniques according to some embodiments of the present disclosure with only minimal additional computational cost and bandwidth utilization. Also, user privacy (anonymity) is protected even if some of the certificate management entities collude.

The invention is not limited to the features described above except as defined by the appended claims.

BRIEF DESCRIPTION OF THE DRAWINGS

FIGS. 4, 5A, and 5B illustrate examples of digital certificates for message authentication.

DETAILED DESCRIPTION OF SOME EMBODIMENTS

This description and the accompanying drawings that illustrate aspects, embodiments, implementations, or applications should not be taken as limiting—the claims define the protected invention. Various mechanical, compositional, structural, electrical, and operational changes may be made without departing from the spirit and scope of this description and the claims. In some instances, well-known circuits, structures, or techniques have not been shown or described in detail as these are known to one skilled in the art. Like numbers in two or more figures represent the same or similar elements.

In this description, specific details are set forth describing some embodiments consistent with the present disclosure. Numerous specific details are set forth in order to provide a thorough understanding of the embodiments. It will be apparent to one skilled in the art, however, that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Example Environment

Figure 1:
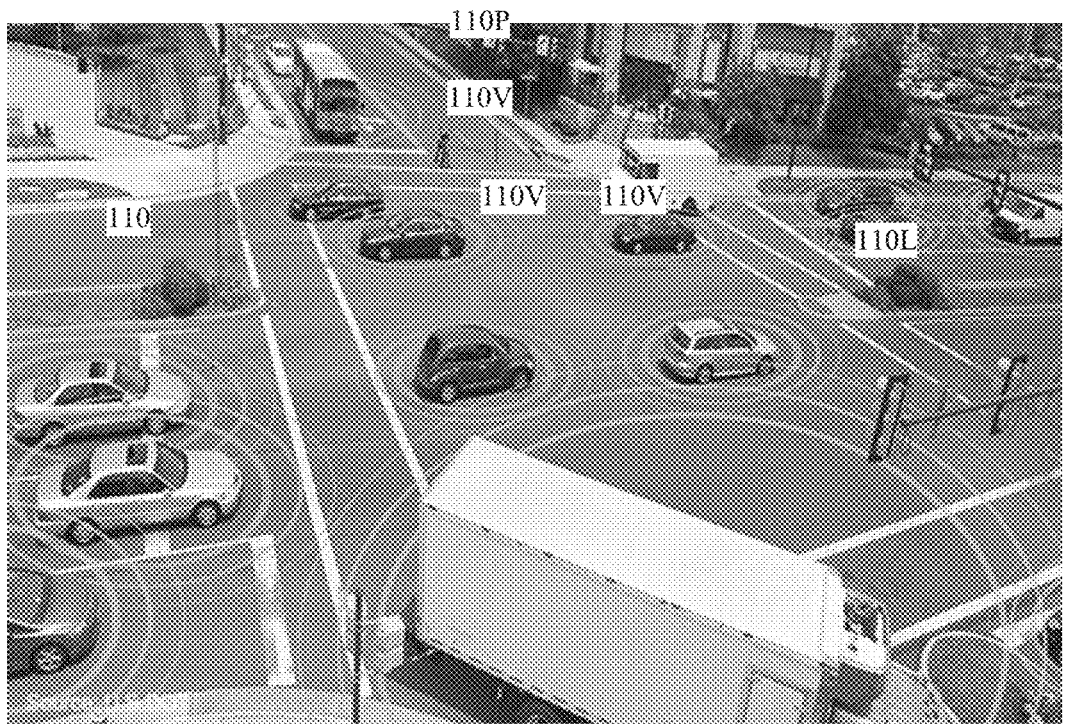
FIG. 1 illustrates an environment in which systems and methods of the present disclosure can operate.

FIG. 1 illustrates an environment in which systems and methods of the present disclosure can operate. FIG. 1 shows a busy intersection with various entities or objects, such as vehicles 110V (cars, trucks, and possibly other types, e.g. trains or bicycles), pedestrians 110P, roadside equipment 110L (e.g., traffic lights, along with hub or gateway for short and longer-range communications). Each of objects or entities 110 (110V, 110L, 110P, etc.) carries or incorporates equipment, such as smartphones, automotive information devices, or other computing devices. Using their respective computing devices, the objects or entities 110 communicate (e.g., wirelessly) to share information, coordinate, etc. Each vehicle 110V may, for example, broadcast its location, speed, acceleration, route, direction, weather information, etc. Such broadcasts can be used to obtain advance information on traffic jams, accidents, slippery road conditions, and allow each vehicle to know where the other vehicles are, and so on. In response, vehicle recipients of such information may alert their drivers, to advise the drivers to stop, slow down, change routes, take a detour, and so on. The traffic lights can be automatically adjusted based on the traffic conditions broadcast by the vehicles and/or other objects 110.

Figure 2:
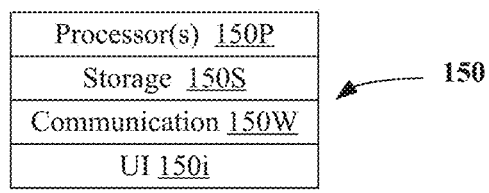
FIG. 2 is a block diagram of a computing device for use in the example environment.

FIG. 2 illustrates an embodiment of a computing device 150 used by the vehicles or other entities and objects, e.g., for communicating, coordinating, etc. in the environment of FIG. 1. As shown in FIG. 2, computing device 150 includes one or more computer processors 150P coupled to computer storage (memory) 150S, and wireless communication equipment 150W for radio communications. Operation of computing device 150 is controlled by processor 150P, which may be implemented as one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 150P.

Memory 150S may be used to store software executed by computing device 150 and/or one or more data structures used during operation of computing device 150. Memory 150S may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, EEPROM, FLASH-EPROM, any other memory chip or cartridge, and/or any other medium from which a processor or computer is adapted to read.

Processor 150P and/or memory 150S may be arranged in any suitable physical arrangement. In some embodiments, processor 150P and/or memory 150S may be implemented on a same board, in a same package (e.g., system-in-package), on a same chip (e.g., system-on-chip), and/or the like. In some embodiments, processor 150P and/or memory 150S may include distributed, virtualized, and/or containerized computing resources. Consistent with such embodiments, processor 150P and/or memory 150S may be located in one or more data centers and/or cloud computing facilities. In some examples, memory 150S may include non-transitory, tangible, machine readable media that includes executable code that when run by one or more processors (e.g., processor 150P) may cause the computing device 150, alone or in conjunction with other computing devices in the environment, to perform any of the methods described further herein Computing device or equipment 150 may include user interface 150i, e.g. such as present in a smartphone, an automotive information device, or of some other type device, for use by pedestrians, vehicle drivers, passengers, traffic managers, and possibly other people.

Figure 3A:
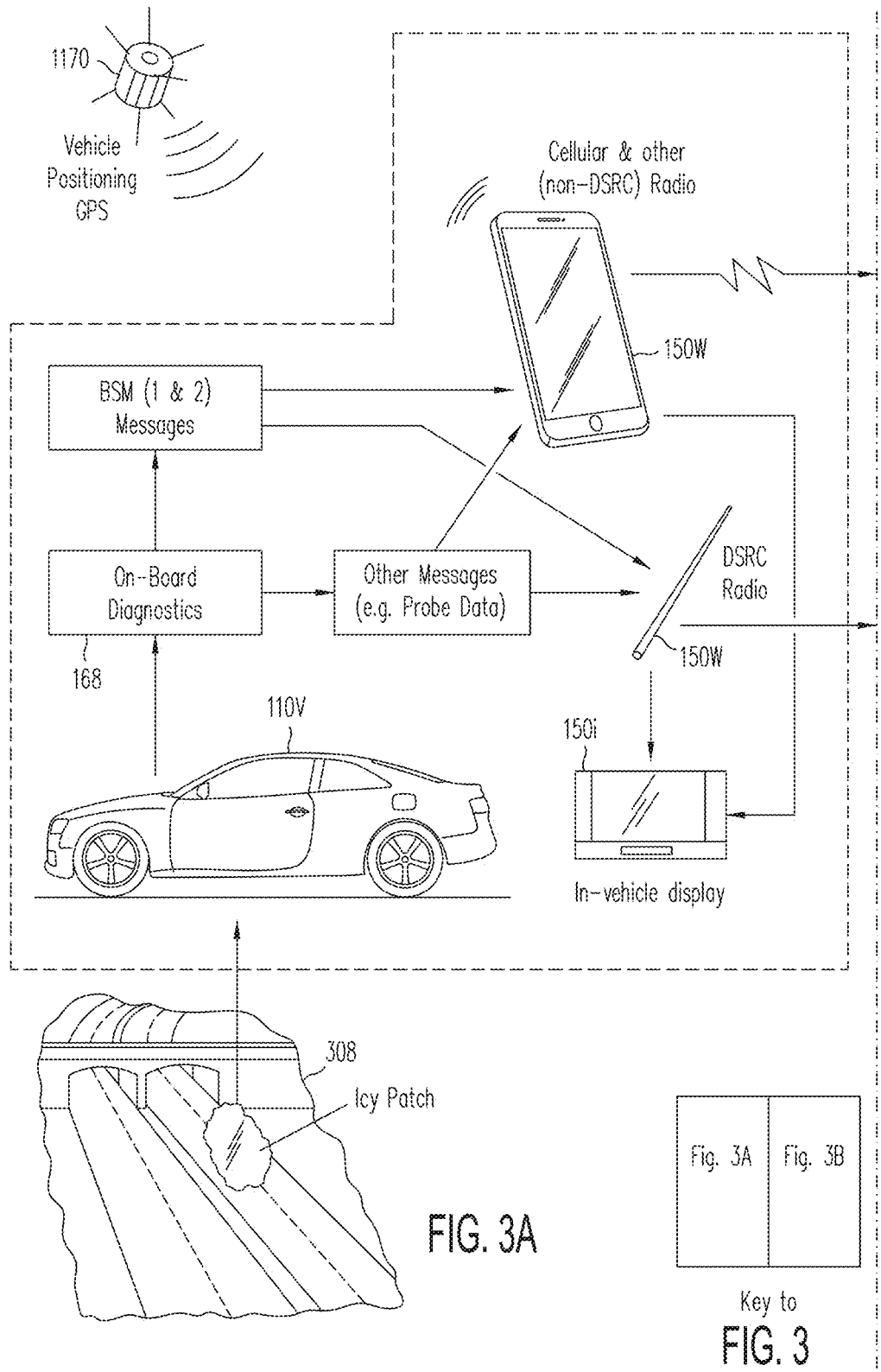
FIGS. 3A and 3B are a representation of communications among vehicles and other equipment in the example environment.
Figure 3B:
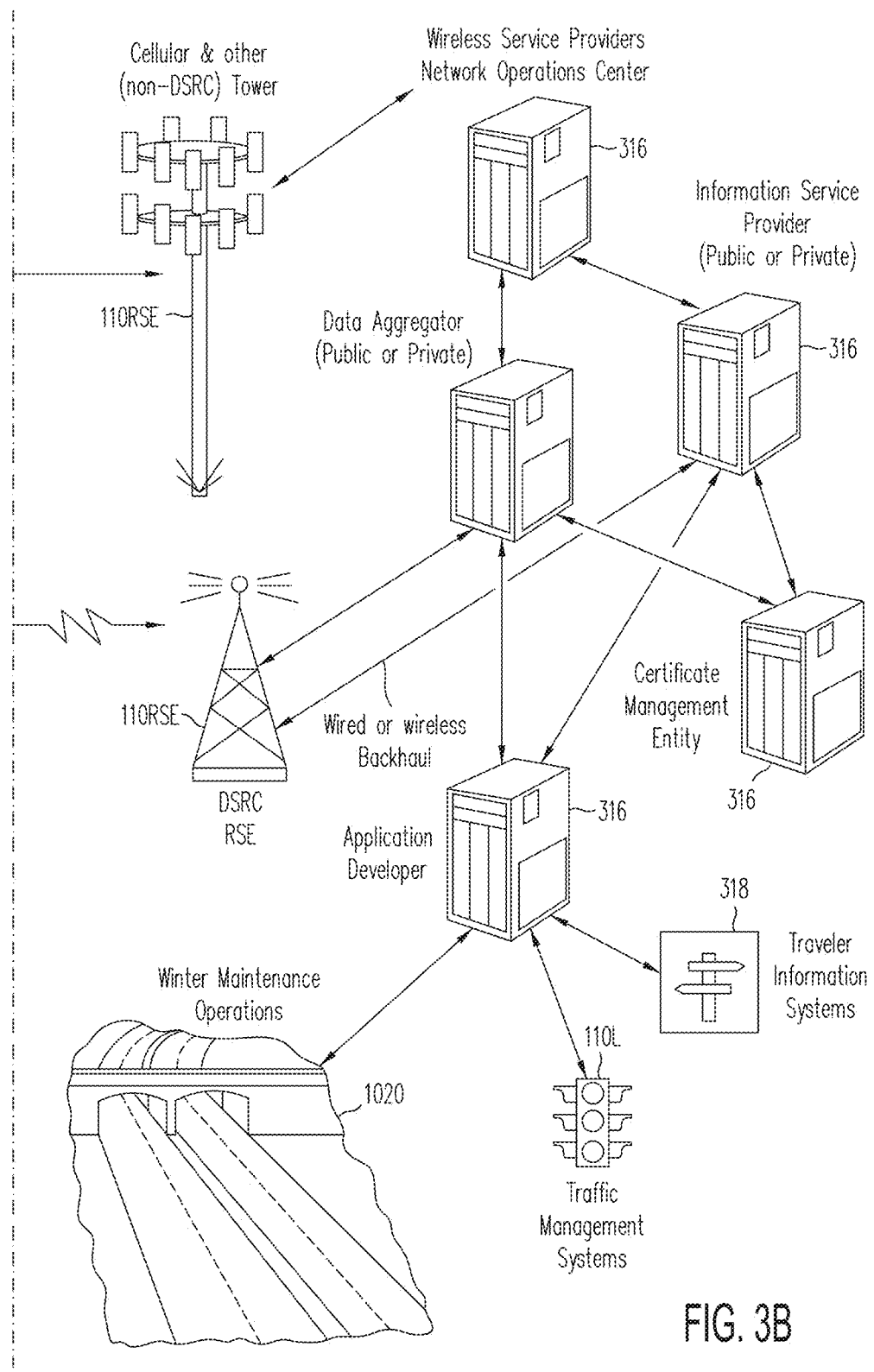

FIGS. 3A and 3B, which together make up FIG. 3, illustrate examples of communication schemes for entities or objects 110 or their computing devices 150 ("object 110", "user 110", and "equipment 150" may be used interchangeably herein when no confusion arises), interacting via V2X or connected vehicle technology. At a scene 308, a vehicle 110V encounters an icy road patch.

The vehicle 110V includes On Board Equipment (OBE) 304 with one or more sensors—such as accelerometers, brake monitors, object detectors, LIDAR, etc.—for sensing conditions within and around vehicles 110V, such as sudden breaking, wheel spin, potential collisions, etc. Using these sensors, the vehicle 110V may, for example, detect the icy road patch at scene 308. The sensors supply information to the OBE's computing device or equipment 150 (FIG. 2) so that it can take action accordingly, e.g., by automatically applying brakes, adjusting steering, and/or notifying the user via a display 150i in case the user needs to react. The computing device 150 may comprise an on-board diagnostics module 168 for performing diagnostics or analysis, for example, on the information provided by the sensors.

Different pieces of equipment on the vehicle 110V communicate by exchanging Basic Safety Messages (BSM) and/or other messages with each other and other vehicles. The BSM messages are described in detail in Whyte et al., "A security credential management system for V2V communications," *IEEE Vehicular Networking Conference*, 2013, pp. 1-8, and CAMP, "Security credential management system proof-of-concept implementation—EE requirements and specifications supporting SCMS software release 1.1," *Vehicle Safety Communications Consortium, Tech. Rep.*, May 2016 (available: https:/www.its.dot.gov/pilots/pdf/SCMS_POC_EE_Requirements.pdf), both of which are incorporated by reference.

A vehicle or other object 110 can obtain its location, for example, by using GPS satellites 1170 or cellular triangulation. The vehicle 110V may also include communication equipment 150W, which, in some embodiments, can include a Direct Short Range Communications (DSRC) radio and non-DSRC radio equipment such as a mobile phone. The vehicle may thus communicate through a cellular system or other road side equipment (RSE) 110RSE directly, i.e., without intermediate network switches. The RSE may act like a gateway to other networks, e.g., the Internet. Using the communication equipment 150W, vehicle 110 can communicate BSM messages and other information to other vehicles, entities, or objects 110 in the V2X or connected vehicle environment. Thus, vehicle 110V/150 may inform the other parts of the environment of the icy patch at scene 308. Likewise, another vehicle 110 may be located in a scene 1020, and may alert other vehicles of winter maintenance operations at that scene.

A traffic management system 110L may comprise equipment—e.g., stoplights, crosswalk lights, etc. located in or near roads, highways, crosswalks, etc.—to manage or control traffic of vehicles, persons, or other objects and entities. Traffic management system 110L may include some of the same or similar equipment as vehicle 110V, including computing devices 150, sensors, user interfaces, communication equipment, etc.

Computer systems 316 process, aggregate, generate, or otherwise operate on information sent to or received from vehicles 110V, traffic management systems 110L, and other objects or entities 110 in the V2X or connected vehicle technology environment, along with their respective computing devices 150. Also shown is a traveler information system 318. Computer systems 316 in can be implemented or incorporate, for example, one or more servers. These computer systems 316, for example, provide or support location and map information, driving instructions, traffic alerts and warnings, information about roadside services (e.g., gas stations, restaurants, hotels, etc.). The computer systems 316 may receive information from the various vehicles, entities, and objects 110 in the environment, process the same, and communicate information or instructions throughout the environment in order to manage the objects, e.g., by adjusting signaling on traffic lights, rerouting traffic, posting alerts or warnings, etc.

This communication capability within the connected vehicle or V2X technology environment is potentially vulnerable to errors and abuse. A malicious user 110 (e.g., a vehicle operator or traffic manager) and/or defective equipment 150 may transmit false or incorrect information to other vehicles, so as to undesirably affect traffic. To protect from such misbehavior, the communications should be authenticated, for example, using a public key infrastructure (PKI). Each vehicle 110V or other equipment is provided with a private key (e.g., for signing a message) and a public key (e.g., for signature verification). The public key is distributed to the public, but the private key is kept secret.

FIGS. 4, 5A, and 5B illustrate examples of digital certificates which can be used for message authentication in the connected vehicle or V2X technology environment. Referring to FIG. 4, a digital certificate 160 is shown.

Digital certificate 160 has a number of fields or parameters. In some embodiments, these include a certificate ID 161, a user ID 162 (e.g., a vehicle ID number or the user's email address), the vehicle's (or user's) public key 164, and possibly other parameters (called metadata), such as the certificate's validity period 165, an identification of the signature scheme, and maybe others. Certificate 160 also includes a signature 166 formed by a certificate authority (CA) over all the fields of the certificate except the signature itself. The CA may reside on or be implemented in computers 316 for example.

Digital certificate 160 can be issued to a vehicle 110V to authenticate the public key 164. The vehicle 110V attaches its certificate 160 to each message 170 transmitted by the vehicle. The message 170 includes message body or content 171, and a digital signature 172 generated by the vehicle using its private key. The message recipient uses the CA's public key to verify the signature 166 and thus authenticate the certificate 160 including the public key 164. The recipient then uses the public key 164 to verify the message signature 172 and thus authenticate the message. In some embodiments, the verification of the certificate's signature 166 and message signature 172 can also be combined (e.g., for better performance).

If the vehicle misbehaves (maliciously or due to a malfunction), its certificate 160 can be revoked. Also, the CA will not issue a new certificate for use after the expiration of the revoked certificate's validity period 165.

A disadvantage of this scheme is potentially compromising user privacy: if a vehicle's transmissions are intercepted, the vehicle can be tracked by tracking the certificate ID 161 or user ID 162 transmitted by the vehicle. To protect user privacy, the user can be issued multiple pseudonym certificates 160p (FIG. 5A) with random-looking strings ("pseudonyms") 164 instead of IDs 161 and 162. The vehicle then uses a pseudonym certificate instead of certificate 160 in message transmissions. The vehicle can automatically use different pseudonym certificates 160p for different messages 170 to avoid tracking.

FIG. 5A illustrates a pseudonym certificate 160p accompanying a message 170. The certificate is generated by a pseudonym certificate authority (PCA). The pseudonym 164, also denoted as U, acts as both the certificate ID and the public key. The certificate 160p may include validity period 165, an identification of the signature scheme, PCA signature 167, and maybe other parameters, similarly to certificate 160 of FIG. 4. Pseudonym certificate 160p also includes linkage value (lv) 234 used for certificate revocation as described below.

The vehicle attaches one of its pseudonym certificates 160p to each message 170 transmitted by the vehicle. The message recipient uses the PCA's public key to verify the PCA signature 167, and uses the pseudonym 164 to verify the message signature 172 and thus authenticate the message 170. In some embodiments, the verification of the certificate's signature 167 and message signature 172 can be combined (e.g., for better performance). Such pseudonym certificates are used in Security Credential Management System (SCMS), originally proposed in Whyte et al., and later extended in CAMP.

In a variation called "implicit certificate" (FIG. 5B), instead of a public key U, the pseudonym field 164 is "credential" data (or "public key reconstruction" data), denoted as V, allowing anyone having the PCA's public key to derive the certificate's public key U. (U is not stored in the certificate 160p.) See for example "Certicom. Sec 4 v1.0: Elliptic curve Qu-Vanstone implicit certificate scheme (ECQV). Technical report, Certicom Research, 2013. http://www.secg.org/sec4-1.0.pdf", ("Certicom" below), incorporated herein by reference.

When a message recipient needs to verify the message signature 172, the message recipient first reconstructs the user's public key U from the pseudonym 164 (V) and the PCA public key, and then uses the user's public key U to verify the signature. Since this process uses the PCA public key, this process not only authenticates the message 170 as coming from a user possessing the certificate 160p, but also verifies the certificate 160p as authenticated by PCA 210. A separate PCA signature 167 is therefore unnecessary and is omitted, reducing the certificate size. See Certicom.

Certificate Revocation

As noted above, when a vehicle misbehaves (due to malice or malfunction), its certificates may have to be revoked. Revocation can be achieved by distributing a list of revoked pseudonym certificates ("Certificate Revocation List", or CRL) to potential recipients of the vehicle's messages. A CRL can be large if the number of revoked vehicles is large. A large CRL takes much memory, network bandwidth, and searching time to determine if a given certificate is in the CRL. Also, a potential recipient device may be hard to reach, e.g. if it is powered down or is out of the network coverage area. Therefore, the CRL size should preferably be reduced.

For efficiency and reliability reasons, it is desirable to generate the pseudonym certificates in large batches, and to distribute the certificates to the vehicles well in advance of the certificates' validity periods 165. However, this policy increases the CRL size because if a vehicle is misbehaving then the CRL may have to include the vehicle's certificates that have been issued to the vehicle but have not become valid. This can be avoided if the certificates are distributed "just-in-time", i.e. right before the certificate's validity period 165.

Another way to limit the CRL size is the Issue First Activate Later (IFAL) scheme, described in the E. Verheul reference cited above. In IFAL, large batches of pseudonym certificates are generated and provided to the vehicles in advance, but the certificates are unusable until activated with activation codes. The activation codes are small, and are provided to the vehicles "just in time", i.e. right before each certificate's validity period 165. A separate activation code is generated for each validity period 165, and is valid for all the certificates having the same validity period. Only "honest" (not misbehaving) devices 110 receive the activation code.

This approach obliges vehicles to periodically contact the V2X infrastructure in order to obtain the activation codes, but since activation codes can be very small, this process can be less cumbersome than the "just-in-time" delivery of small batches of certificates immediately before their corresponding validity periods. However, since an activation code can be used with any certificate for the corresponding activation period, the activation code must be distributed over a secure communication channel to be unavailable to revoked certificate holders.

Another problem in any pseudonym certificate infrastructure is potential comprise of the certificate authority (CA) that issues pseudonym certificates: even without colluding with any other entity, the CA can link the pseudonym certificates to the corresponding device (to the corresponding device's enrollment certificate provided to the CA); therefore, the users' privacy depends on that CA's willingness to delete the linking information.

One technique that addresses some of the problems noted above is Binary Hash Tree based Certificate Access Management (BCAM) described in Kumar et al. Like IFAL, the BCAM scheme distributes pertinent data, called device specific values (DSVs), "just in time" to allow the vehicles to activate the certificates distributed in advance. But in contrast to IFAL, BCAM's DSVs depend not only on the certificates' validity periods 165 but also on the associated vehicles' IDs. A DSV for any vehicle cannot activate a certificate for any other vehicle, so the DSVs of the honest vehicles can be broadcast over insecure channels. Also, while generating a separate DSV for each vehicle increases the computational and networking costs, the DSVs can be compressed using a hash tree.

Further, BCAM was designed to interoperate with the SCMS architecture, inheriting SCMS ability to protect the privacy of honest users against a dishonest CA or any other non-colluding system entities.

More particularly, the BCAM's DSVs are small pieces of information that are broadcast by a Certificate Access Manager (CAM). Each batch of certificates issued to a given vehicle is encrypted by CAM, and the decryption key can be computed by the vehicle from the DSV generated by the CAM from the vehicle's ID. Further, the DSVs of the honest vehicles can be compressed using the binary hash tree. If all the vehicles are honest, then CAM can broadcast only the tree's root to allow all the vehicles to decrypt the corresponding pseudonym certificates.

A separate tree is created for each validity period. To revoke a misbehaving vehicle for a given validity period, the CAM will not transmit the tree nodes that would allow the misbehaving vehicle's DSV computation.

BCAM creates a highly efficient revocation process, but also creates an extra point of collusion: CAM learns which batch of (encrypted) certificates belong to a same vehicle, so CAM can collude with the CA ("Pseudonym CA", or "PCA") to link those certificates together when they are used by the vehicle. In addition, in the certificate issuance process, the PCA encrypts the certificates to hide them from another SCMS entity (Registration Authority or RA), and then CAM encrypts the certificates again to prevent their activation without the DSV. This double encryption increases the computation costs and, possibly, the network bandwidth utilization (due to increased size of the doubly encrypted certificate versus a single encryption).

In some embodiments of the present disclosure, the two encryptions are replaced by one. Specifically, the CAM does not encrypt the certificate, but the CAM-generated DSV is included in the encryption process performed by the PCA. Further, the PCA does not know the DSV; rather, the encryption process uses an activation code generated from the DSV and provided to the PCA. The PCA cannot recover the DSV from the activation code, nor link the activation codes for a given vehicle to each other. On the other hand, the activation codes are unknown to CAM. This scheme makes it harder for the PCA and CAM to link activation codes to the vehicle or each other even if the PCA and CAM collude.

We will now describe pertinent SCMS features to illustrate some embodiments. The invention is not limited to SCMS however.

Security Credential Management System (SCMS)

Security Credential Management System (SCMS) is one of the most prominent among the various pseudonym-based security solutions for V2X. SCMS was originally proposed in W. Whyte, A. Weimerskirch, V. Kumar, and T. Hehn, "A security credential management system for V2V communications," in IEEE Vehicular Networking Conference, 2013, pp. 1-8, incorporated herein by reference. SCMS was later extended in CAMP, "Security credential management system proof-of-concept implementation—EE requirements and specifications supporting SCMS software release 1.1," Vehicle Safety Communications Consortium, Tech. Rep., May 2016. [Online]; available: https://www.its.dot.gov/pilots/pdf/SCMS_POC_EE_Requirements.pdf; incorporated herein by reference. SCMS is presently considered one of the leading vehicular public-key infrastructure (VPKI) candidate designs for protecting V2X—vehicle-to-vehicle (V2V) and vehicle-to-infrastructure (V2I)—communications in the United States. SCMS deals with revocable privacy while preventing any given certificate management entity from tracking devices 110/150 by the entity itself, i.e., without colluding with other system entities. By doing so, SCMS copes with security needs of V2X while elegantly addressing a threat model in which the system's entities can be considered "honest-but-curious," i.e., they follow the correct protocols but may try to track vehicles if this can be done in an undetectable manner, as described in Khodaei et al., "The key to intelligent transportation: Identity and credential management in vehicular communication systems," *IEEE Vehicular Technology Magazine*, vol. 10, no. 4, pp. 63-69, December 2015, which is incorporated by reference. This is accomplished by combining (A) an efficient and privacy-preserving method for vehicles to obtain large batches of pseudonym certificates, and (B) an ancillary process for revoking the user's privacy in case of misbehavior, so multiple certificates belonging to a same user can be easily linked together.

The description below is structured as follows. We start by introducing our notation. Then we give an overview of SCMS, focusing on its procedure for creating and delivering batches of pseudonym certificates (the so-called "butterfly key expansion"). The discussion is mostly based on the description given in W. Whyte, A. Weimerskirch et al. Nevertheless, some embodiments are pertinent to CAMP, and when pertinent we mention where modifications were done by CAMP.

Then we describe our certificate revocation based on activation codes, and describe how some embodiments of our certificate revocation can be integrated into SCMS.

Subsequently, we describe another system, called eSCMS, proposed by the authors of this document, that improves the pseudonym provisioning process by unifying the generation of butterfly keys for encryption and signature. eSCMS is described in U.S. patent application Ser. No. 16/165,871, filed 19 Oct. 2018, incorporated herein by reference. We then show how some embodiments of our certificate revocation can be integrated into eSCMS.

General Notation

For convenience, the "Symbols" Table below includes a list of the symbols and general notation adopted in this disclosure for the relevant environment including V2X, connected vehicle, and/or SCMS.

TABLE

Symbols

| Symbol | Meaning |
|---|---|
| U | A vehicle's public key, different for each pseudonym certificate, and used as a pseudonym, placed in pseudonym a certificate |
| u | The private key corresponding to U |
| s, S | Private and public caterpillar keys for signature |
| e, E | Private and public caterpillar keys for encryption |
| $\hat{s}, \hat{S}$ | Private and public cocoon keys for signature |
| $\hat{e}, \hat{E}$ | Private and public cocoon keys for encryption |
| x, X | Private and public unified caterpillar keys |
| $\hat{x}, \hat{X}$ | Private and public unified cocoon keys |
| β | Number of cocoon keys in a batch of pseudonym certificates generated in response to a request to generate the pseudonym certificates |
| σ | Number of certificates valid in each time period |
| lv | Linkage value |
| enc(key, str) | Encryption of a bit string str with key |
| hash(str) | Hash of str |

The notation $str_1 \| str_2$ is used to represent the concatenation of bit strings $str_1$ and $str_2$. The notation enc(key, str) denotes the encryption of a bit string str with key, which can be done using standard block ciphers such as the Advanced Encryption Standard (AES), as described in more detail in NIST, *Federal Information Processing Standard (FIPS 197)—Advanced Encryption Standard (AES)*, National Institute of Standards and Technology, U.S. Department of Commerce, Gaithersburg, MD, USA, November 2001, available: http://csrc.nist.gov/publications/fips/fips197/fips-197.pdf. Similarly, the notation hash(str) denotes the hash of str, using some standard hash function such as SHA-2 or SHA-3, as described in more detail in NIST, *Federal Information Processing Standard (FIPS 180-4)—Secure Hash*

Standard (*SHS*), National Institute of Standards and Technology, U.S. Department of Commerce, Gaithersburg, MD, USA, August 2015, DOI:10.6028/NIST.FIPS.180-4, and NIST, *Federal Information Processing Standard (FIPS 202)—SHA-3 Standard: Permutation-Based Hash and Extendable-Output Functions*, National Institute of Standards and Technology, U.S. Department of Commerce, Gaithersburg, MD, USA, August 2015, DOI: 10.6028/NIST-.FIPS.202, both of which are incorporated by reference herein.

The length of a given string str in bytes is denoted |str|. We denote by G the generator point of an elliptic curve group (written additively), denoted as "Gr".

In SCMS, each device (110/150) receives two types of certificates: an enrollment certificate 160, which has a long expiration time T and identifies a valid device in the system; and multiple pseudonym certificates 160$p$, each having a short validity (e.g., a few days), in such a manner that $\sigma \geq 1$ pseudonym certificates may be valid simultaneously. For protecting its privacy, a particular vehicle may frequently change the pseudonym certificate employed in the vehicle's communications, thus avoiding tracking by nearby vehicles or by roadside units. In practice, it is useful to limit the value of $\sigma$ to a small number to avoid "sybil-like" attacks (as described in detail in Douceur, "The Sybil attack," *Proceedings of 1st International Workshop on Peer-to-Peer Systems (IPTPS)*. Springer, January 2002 (Available: https://www-.microsoft.com/en-us/research/publication/the-sybil-attack/), which is incorporated herein by reference), in which one vehicle poses as a platoon aiming to gain some advantage over the system (see Moalla et al., "Risk analysis study of ITS communication architecture," *3rd International Conference and The Network of the Future*, 2012, pp. 2036-2040, which is incorporated herein by reference). For example, such a fake platoon could end up receiving preferential treatment from traffic lights programmed to give higher priority to congested roads.

Example SCMS Architecture

Figure 6:
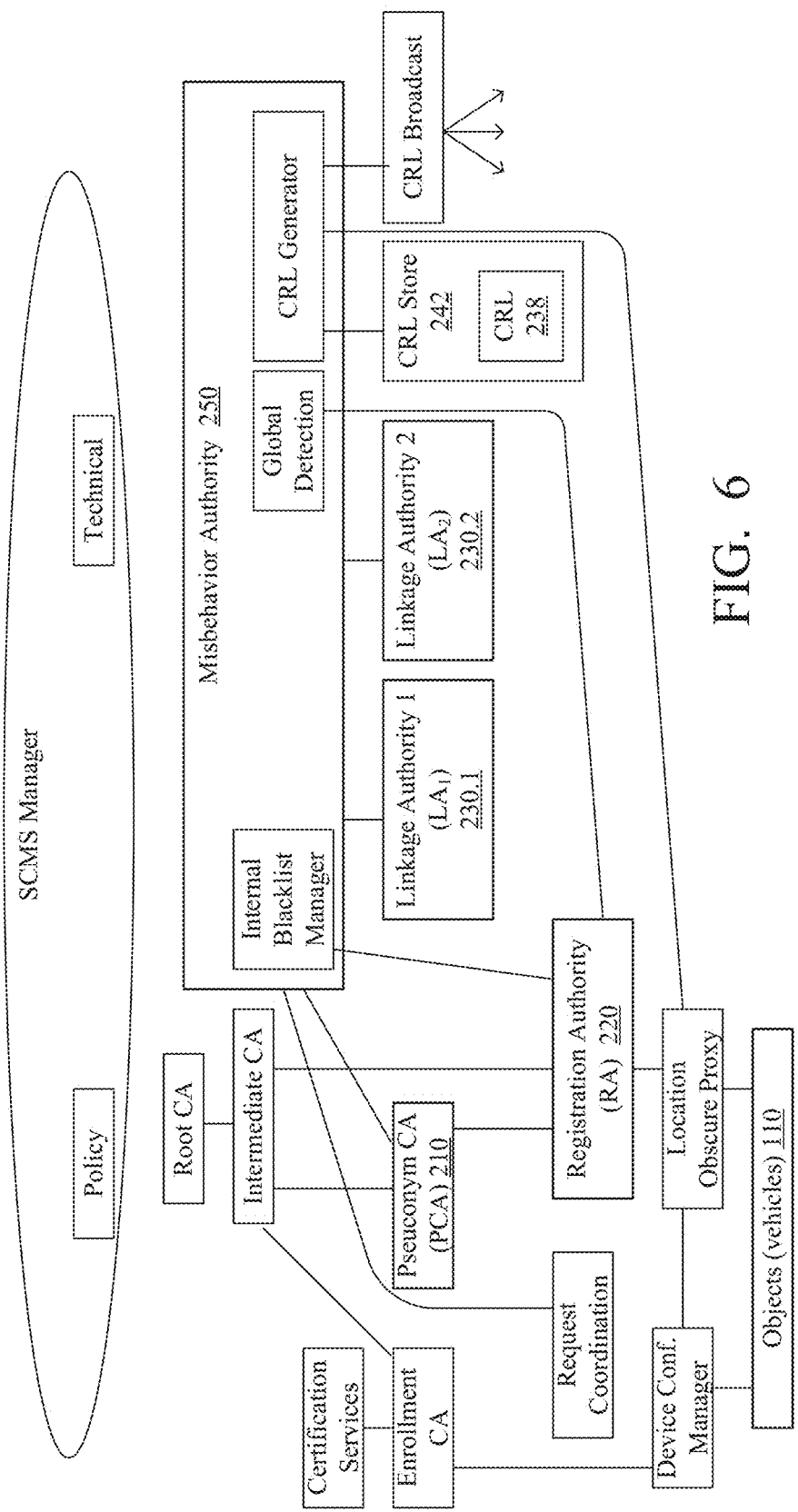
FIG. 6 is a block diagram illustrating computer system architecture suitable for digital certificate management.

FIG. 6 illustrates an exemplary computer system architecture environment for SCMS. SCMS was designed to allow the distribution of multiple pseudonym certificates to vehicles in an efficient manner, while providing mechanisms for easily revoking them in case of misbehavior by their owners.

In SCMS, a Registration Authority (RA) 220 provides batches of pseudonym certificates 160$p$ to authorized vehicles or objects 110/150. A batch is generated from a single request received from a vehicle, in the butterfly key expansion process. RA 220 validates the vehicle requests by the vehicles' enrollment certificates 160. In addition to an enrollment certificate, each request includes some public keys (other than 164) generated by the vehicle for the pseudonym certificate provisioning process. These public keys are labeled as 710 in FIG. 7 discussed below. RA 220 then shuffles together the keys 710 belonging to different users before individually sending them to a Pseudonym Certificate Authority (PCA) 210. As such, the PCA 210 cannot link a group of requests to a same object 110/device 150. The PCA 210, in turn, creates valid certificates 160$p$, and encrypts and signs them before delivering them to the RA for forwarding to the devices 110/150. Since the certificates 160$p$ are encrypted, the RA cannot link a pseudonym certificate 160$p$ to a device 110/150. Unless the PCA and RA collude, they are unable to link a certificate 160$p$ to its owner 110/150.

Linkage Authority (LA) 230, or rather linkage authorities $LA_1$ and $LA_2$—also labeled as 230.1 and 230.2—generate random-like bitstrings that are combined to create a linkage value (lv 234 in FIGS. 5A, 5B) added to pseudonym certificates 160$p$ so that the pseudonym certificates can be efficiently revoked. The lv values are different for different pseudonym certificates, but they can be linked together for a given enrollment certificate 160. See e.g. U.S. patent application No. 62/561,667, filed 21 Sep. 2017, incorporated herein by reference; U.S. patent application Ser. No. 16/136,621, filed 20 Sep. 2018, incorporated herein by reference; and Marcos A. Simplicio Jr. et al., "A privacy-preserving method for temporarily linking/revoking pseudonym certificates in vehicular networks", https://eprint.iacr.org/2018/185.pdf, 2018, incorporated herein by reference.

Misbehavior Authority (MA) 250 obtains a misbehaving device's certificate 160$p$ and uses the certificate's lv 234 and data obtained from the RA and PCA to revoke all of the same device's certificates 160$p$.

In some embodiments, each of RA 220, PCA 210, LAs 230, and MA 250 can be implemented with or incorporate one or more computing devices (e.g., computing device 150 or computer systems 316).

SCMS's Butterfly Key Expansion

Figure 7:
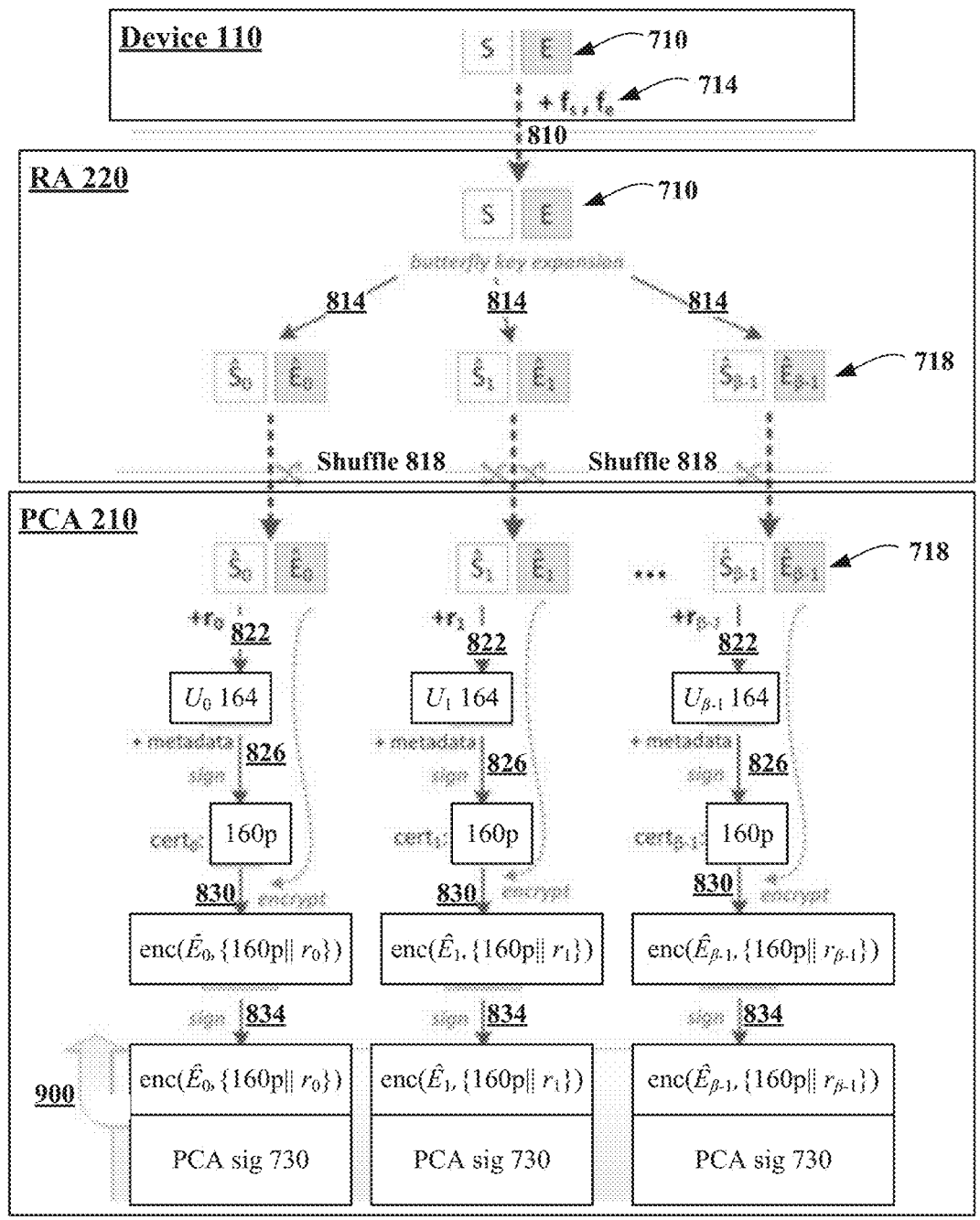
FIGS. 7 and 8 are flowcharts that illustrate prior art processes for generating digital certificates.

The pseudonym certification provisioning process in SMCS provides an efficient mechanism for devices 110 to obtain arbitrarily large batches of (short-lived) certificates 160$p$ with a small-sized request message. The process is illustrated in FIG. 7. First, the requesting device 110/150 generates two "caterpillar" private/public key pairs 710:

$$(s, S = s \cdot G) \text{ and } (e, E = e \cdot G)$$

The private keys s and e should be random. The keys are generated using elliptic curve cryptography. The keys (s,S) relate to generation of pseudonyms 164 (FIGS. 5A, 5B), and are called "signature keys" because the pseudonyms 164 are used for message authentication via signature verification as described above. The keys (e,E) relate to pseudonym certificate encryption performed to hide the pseudonyms from the RA as described below; these keys are called "encryption keys".

At step 810, the device 110 requests the RA to generate some predefined number $\beta$ of pseudonym certificates 160$p$. The request sent to the RA includes the public caterpillar keys S and E, shown at 710. In addition to keys 710, the request includes data defining two suitable pseudorandom functions (PRF) 714, denoted $f_s$ and $f_e$. (In some embodiments, the function-defining data may be the seeds of these functions; the functions' outputs can be computed from the seeds. Alternatively, while less efficient, the function-defining data may include the entire description of the PRFs, including the description of the computational algorithms for the PRFs.)

The RA may receive such requests from different devices 110, and generates $\beta$ pseudonym certificates 160$p$ for each device as follows. For each request, the corresponding keys S and E are employed by the RA, at step 814, for generating public cocoon keys 718. Specifically, at step 814, the key S is used in the generation of $\beta$ public cocoon signature keys:

$$\hat{S}_i = S + f_s(i) \cdot G$$

for all i such that 0≤i<β. Similarly, at the same step 814, the RA uses the key E for generating β public cocoon encryption keys:

$$\hat{E}_i = E + f_e(i) \cdot G$$

Pairs of cocoon keys 718, i.e. ($\hat{S}_i$, $\hat{E}_i$), from different devices 110 are then shuffled together by RA 220 (step 818) and sent individually or in batch to PCA 210 for the generation of the corresponding pseudonym certificates 160*p*. Each pair of cocoon keys is accompanied by the corresponding metadata, such as validity period 165 and data required for computation of linkage value (lv) 234; see FIGS. 4, 5A, 5B.

Figure 8:
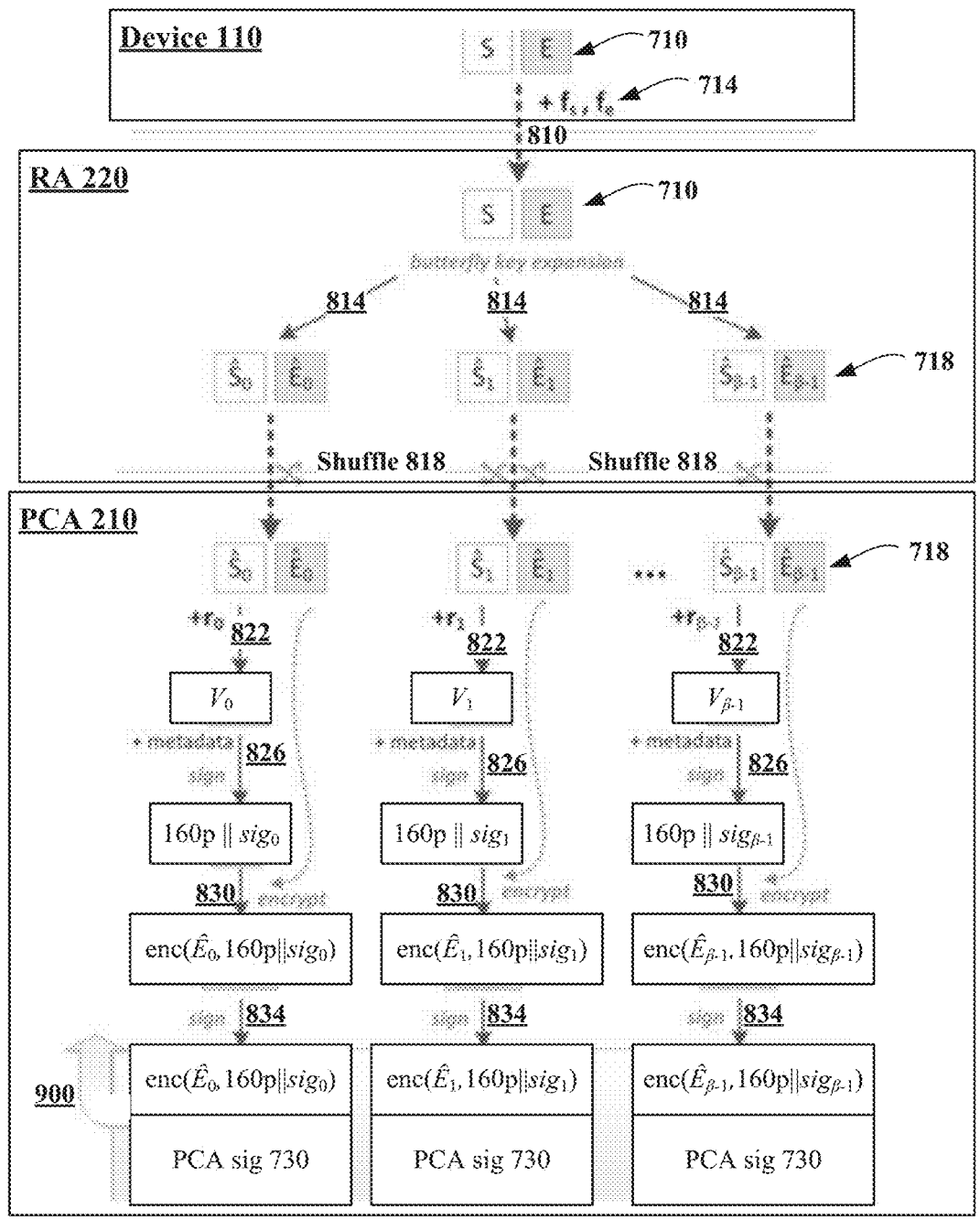

For each pair of cocoon keys ($\hat{S}_i$, $\hat{E}_i$), the PCA can either create an explicit pseudonym certificate 160*p* (FIG. 5A) using the method of FIG. 7, or engage in an implicit certification process (FIG. 5B and Certicom) as illustrated in FIG. 8. The explicit or implicit certificate 160*p* is encrypted by the PCA and sent to the RA (step 900 in FIGS. 7, 8)). The RA "un-shuffles" the pseudonym certificates, and sends each pseudonym certificate to the corresponding (associated) device 110. Each device's β pseudonym certificates are sent to the device in batch.

For the explicit process (FIGS. 5A, 7), the PCA computes, at step 822, a random value $r_i$ and generates the certificate's public signature key (pseudonym) 164 according to the following equation (Eq. 1):

$$U_i = \hat{S}_i + r_i \cdot G \qquad \text{(Eq. 1)}$$

At step 826, the PCA forms the certificate 160*p*, also shown as $cert_i$, by: (1) combining $U_i$ with the metadata, e.g. the certificate's validity period 165 and the linkage value (lv) 234; and (2) digitally signing the combination to form the signature 167 (FIG. 5A).

The PCA then encrypts the certificate 160*p* together with the value of $r_i$, using the corresponding cocoon key $\hat{E}_i$ (step 830). The encrypted package (certificate 160*p* and value $r_i$) is signed again by the PCA (step 834) using the PCA's private signature key. The signature is shown at 730.

The result, i.e. the encrypted and signed package, is sent to the RA (step 900). The RA forwards the result to the requesting device 110.

Only the requesting device 110 can decrypt the value:

$$enc(\hat{E}_i, 160p\|r_i)$$

(see step 834) because only the requesting device 110 knows the private key corresponding to the cocoon key $\hat{E}_i$. This private key is given by the following equation (Eq. 2):

$$\hat{e}_i = e + f_e(i) \qquad \text{(Eq. 2)}$$

Therefore, only the device 110 can learn the pseudonym $U_i$ (as part of certificate 160*p*) and compute the corresponding private signature key:

$$u_i = s + r_i + f_s(i) \qquad \text{(Eq. 3)}$$

The device 110 can also verify the signature keys $u_i$, $U_i$ by checking that:

$$U_i = u_i \cdot G \qquad \text{(Eq. 4)}$$

Device 110 also verifies the PCA signature 730 to prevent the Man-in-the-Middle attack by the RA as described below.

For implicit certificates 160*p*, this process is as follows (see FIG. 8). The cocoon key generation (steps 810, 814, 818) is the same as for the explicit certificates. Then at step 822, the PCA computes a random $r_i$, and computes the credential 164:

$$V_i = \hat{S}_i + r_i \cdot G \qquad \text{(Eq. 5)}$$

Then at step 826, the PCA creates the implicit certificate 160*p*, also denoted $cert_i$, as:

$$cert_i = (V_i, meta)$$

i.e.

$$cert_i = V_i\|meta$$

where "meta" is the metadata (including validity period 165 etc.).

Also at step 826, the PCA signs this certificate to obtain the signature $sig_i$ as follows:

$$sig_i = h_i \cdot r_i + u_{PCA} \qquad \text{(Eq. 6)}$$

where $h_i$=Hash($cert_i$), and $u_{PCA}$ is the PCA's private signature key.

The remaining steps of the certificate generation are similar to FIG. 7. Specifically, the PCA encrypts the certificate 160*p* together with the signature value of $sig_i$, using the corresponding cocoon key $\hat{E}_i$ (step 830). The encrypted package (certificate 160*p* and value $sig_i$) is signed by the PCA (step 834) using the PCA's private signature key. The signature is shown at 730. At step 900, the result (the encrypted structure and the signature 730) is sent to the requesting device 110 via the RA 220.

The device 110 verifies the PCA signature 730, decrypts the package $cert_i\|sig_i$, and computes:

$$h_i = \text{Hash}(cert_i) \qquad \text{(Eq. 7)}$$

Device 110 then sets its own private signature key to:

$$u_i = h_i \cdot (s + f_s(i)) + sig_i \qquad \text{(Eq. 8)}$$

whereas the corresponding public signature key takes the form:

$$U_i = u_i \cdot G \quad \text{(Eq. 9)}$$

The device 110 can then verify the validity of the public key $U_i$ by ascertaining that $$U_i = h_i \cdot V_i + U_{PCA} \quad \text{(Eq. 10)}$$

where $U_{PCA}$ is the PCA's public signature key corresponding to $u_{PCA}$.

Whichever certificate model is adopted, at step 834 of FIGS. 7 and 8, the encrypted PCA response is signed using the PCA's own private signature key $u_{PCA}$, aiming to prevent an "honest-but-curious" RA from engaging in a Man-in-the-Middle (MitM) attack. Namely, without this signature 730, a MitM attack by the RA could be performed as follows: (1) instead of $\hat{E}_i$, the RA sends to the PCA, at step 818, a fake cocoon encryption key $\hat{E}^*_i = z \cdot G$, for an arbitrary value of z; (2) at step 900, the RA decrypts the PCA's response using z, learning the pseudonym $U_i$ (FIG. 7) or $V_i$ (FIG. 8); and (3) the RA re-encrypts the certificate with the correct $\hat{E}_i$, sending the result to the device, which proceeds with the protocol as usual. But if the PCA generates signature 730 and device 110 verifies the signature 730 on the RA's response, the attack would fail because the RA cannot provide a valid signature 730 for the re-encrypted certificate generated in step (3).

Independently of the type of certificate adopted (explicit or implicit), the user's privacy is protected in this process as long as the RA and PCA do not collude. After all, the shuffling of public cocoon keys performed by the RA (step 818) prevents the PCA from learning whether or not any keys 718 belong to a same device. Unlinkability of public keys $U_i$ (FIG. 7) or $V_i$ (FIG. 8) to the devices for the RA, in turn, is also obtained because the latter does not learn the value of $U_i$ or $V_i$ randomized by the PCA using $r_i$.

Description of Some Certificate Activation Process Embodiments

In SCMS and other CRL based certificate revocation systems, the cost of checking whether a certificate is included in a given CRL grows linearly with number of devices included in that CRL. Therefore, ensuring that the number of CRL entries remains small is beneficial not only to save bandwidth when distributing CRLs, but also to allow a faster and more energy-efficient verification of a certificate's revocation status. SCMS can use a Linkage Authority based mechanism for shortening the CRLs, which associates several certificates to the same entry (lv 234). But this mechanism also extends the lifetime of those entries in the CRL. After all, linkage seeds placed into a CRL can only be safely removed from the CRL after all certificates associated to those seeds are expired. Consequently, even if device revocation events occur at a low frequency, CRLs may actually grow big because the corresponding entries will remain in the CRL for a duration comparable to that of certificate batches (e.g., years).

To avoid this growth of CRLs while preserving the performance gains associated with the butterfly key derivation, we propose an activation code scheme, some embodiments of which are usable with SCMS as explained below. Our activation code is a bitstring without which the pseudonym certificates previously acquired cannot be used (for example, cannot be decrypted). Each activation code corresponds to a certain activation period, which spans one or more certificate validity periods 165. The activation codes are derived by the vehicles (or other types of devices) from device specific values (DSVs) periodically disclosed to non-revoked vehicles, before the start of the corresponding validity periods 165, to allow timely activation of the certificates. Each DSV corresponds to a specific vehicle and an activation period. Revoked vehicles do not receive their DSVs, and are prevented from obtaining activation codes for their certificates, at least until their revocation status is removed. As a result, identifiers (pseudonyms or credentials 164, and/or linkage values 234) of revoked certificates that cannot be activated do not need to remain in CRLs, reducing the CRL size. For example, certificates could be valid for 1 week, whereas the activation period could be set to 4 weeks and be disclosed 1 week before they are actually required. In this case, identifiers for certificates from revoked vehicles would have to remain in CRLs for at most 4 weeks, since after that those vehicles would not receive new DSVs.

Some embodiments of the proposed scheme address the main shortcomings of IFAL and BCAM solutions in terms of performance and security, as discussed below.

Generating Activation Codes: Binary Hash Trees

Some embodiments of the present disclosure use binary hash trees 840 (FIG. 9) as described below. The use of trees is optional however.

Figure 9:
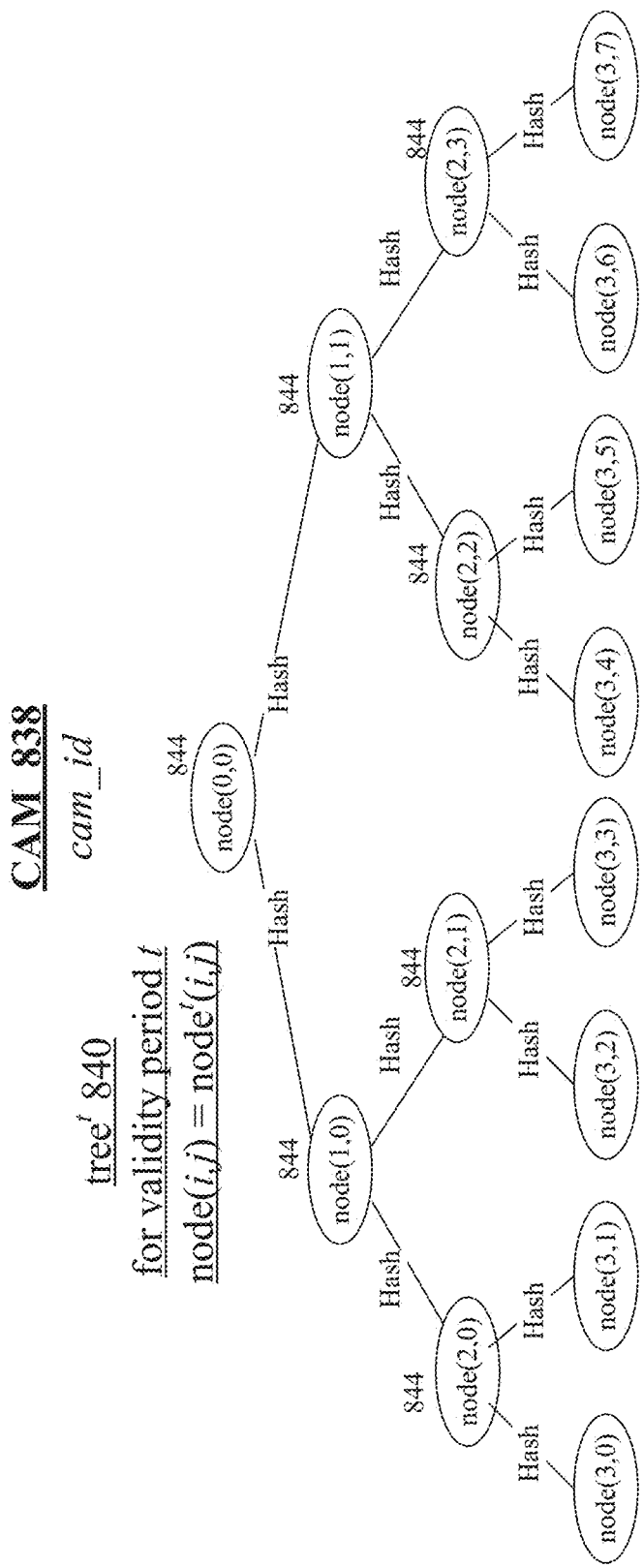
FIG. 9 illustrates a hash tree used in some embodiments of the present disclosure.

Similarly to BCAM, some embodiments of our system include one or more Certificate Access Managers (CAM) 838, shown in FIG. 9, each possibly having a different identifier cam id. CAMs 838 are entities responsible for creating and distributing device specific values (DSVs). A CAM can be implemented on one or more computer systems 316. To create and distribute the DSVs, CAM 838 creates, in its storage 150S (FIG. 2), a binary hash tree tree$^t$ (tree 840 in FIG. 9) for each time period t, i.e. each validity period 165. In some embodiments, only one tree 840 is created for multiple validity periods in the same activation period. An activation period may consist of one or more validity periods. If the activation period spans n+1 validity periods, then tree$^t$ = . . . =tree$^{t+n}$.

The tree's nodes 844 are denoted node$^t$(depth, count), where depth$\geq$0 and 0$\leq$count$\leq 2^{depth}-1$ indicate the node's position in the tree. The height of the tree matches the length of the vehicles' identifiers (VID), in bits. As a result, each leaf node$^t$(depth, count) can be used as a DSV to represent a single vehicle 110 in the system: the one with VID=count. In Kumar et al., for example, the suggested length of VID is 40 bits, which is enough to cover more than 1 trillion vehicles. The bit lengths do not limit the invention.

The hash tree allows compressing the DSVs for distribution to the vehicles: all the leaves of any sub-tree can be distributed by distributing the root of the sub-tree, so if all the leaves of a sub-tree correspond to honest vehicles then only the root of the sub-tree needs to be distributed. Each root is accompanied by its (depth, count) parameter, so the vehicles can compute the leaf values from the root.

The activation codes can be computed by the vehicles from the corresponding DSVs using a pseudo-random function PRF to strengthen the system against a possible collusion between the CAM and the PCA, as described below.

In an exemplary embodiment, the nodes 844 are assumed to be 128-bit long, although they could be larger or smaller depending on the desired security level. The tree 840 is built in the following manner. First, its root node$^r$(0,0) is set to a random bitstring, unique for each activation period. Every other node 844 is then computed from its parent node combined with a "security string" I, used as a node-specific suffix. More precisely, we have:

$$\text{node}^r(\text{depth, count}) = \text{Hash}(\text{node}^r(\text{depth} - 1, \lfloor \text{count}/2 \rfloor) \| I) \quad \text{(Eq. 11)}$$

where the security string I is defined as $$I = (\text{cam\_id} \| t \| \text{depth} \| \text{count}) \quad \text{(Eq. 12)}$$

If the activation period spans multiple validity time periods 165, then t should be set to the first time period 165 covered by that activation period. This approach gives the system enough flexibility to increase or reduce the length of the activation periods without incurring the repetition of security strings. As further discussed in the Appendix, such non-repeatable security strings are useful to thwart birthday attacks analogous to those described in W. Aiello, S. Lodha, and R. Ostrovsky, "Fast digital identity revocation (extended abstract)," in Proc. of the 18th Annual International Cryptology Conference on Advances in Cryptology (CRYPTO'98). London, UK, UK: Springer-Verlag, 1998, pp. 137-152, incorporated herein by reference.

The Table below shows suggested lengths for the fields that compose those security strings, leading to |I|=104. This length is large enough to support 40-bit long VIDs for $2^24$ time periods, which means more than 300000 years if the time periods are 1 week long. At the same time, it is unlikely to have any perceptible impact on the computation of activation trees 840, as long as the hash function's input fits its block size. For example, SHA-256 operates on 512-bit blocks, appending at least 65 bits to its input message (a bit '1' for padding, and a 64-bit length indicator); see NIST, Federal Information Processing Standard (FIPS 180-4)—SecureHash Standard (SHS), National Institute of Standards and Technology, U.S. Department of Commerce, National Institute of Standards and Technology, U.S. Department of Commerce (NIST), Gaithersburg, MD, USA, August 2015, DOI:10.6028/NIST.FIPS.180-4. Therefore, a single call to its underlying compression function is enough to process a 128 bit node value even when it is combined with a 319-bit or smaller security string.

TABLE

COMPONENTS OF THE SECURITY STRINGS EMPLOYED IN THE ACTIVATION TREES ACCORDING TO SOME EMBODIMENTS OF THE PRESENT DISCLOSURE

| Field | Suggested length (bits) | Description |
| --- | --- | --- |
| depth | 8 | Node's depth in tree, starting at 0. Mandatory: \|depth\| ≥ lg(\|VID\|). |
| count | 40 | Node's index in the depth, starting at 0. Mandatory: \|count\| ≥ \|VID\|. |
| t | 24 | Time period to which the tree is associated |
| cam_id | 32 | CAM's identifier |

The equations (Eq. 11) and (Eq. 12), and other tree-related particulars, are optional and do not limit the invention.

Integrating Activation Codes into the Certificate Issuing Process

Figure 10A:
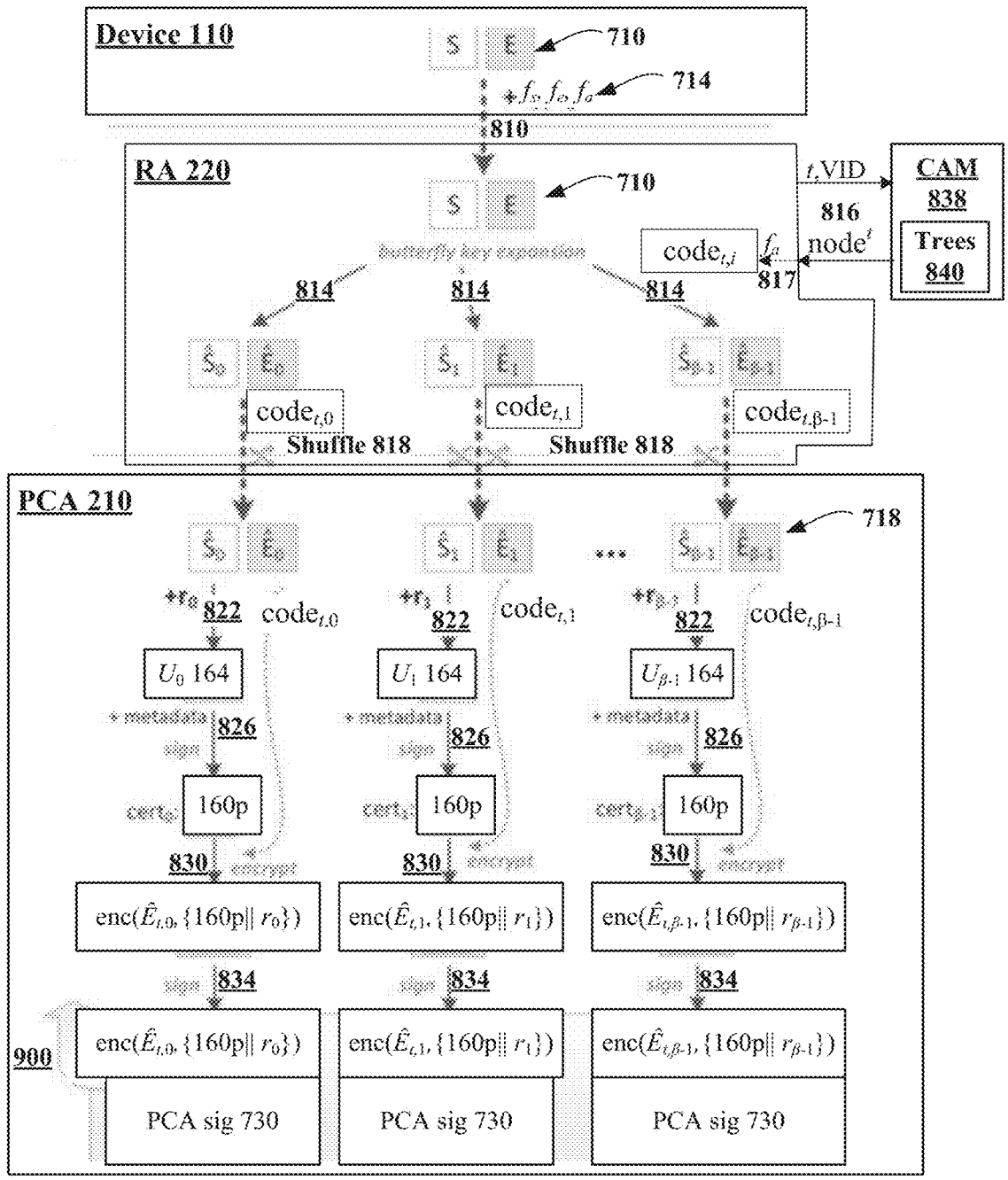
FIGS. 10A, 10B, 11A, 11B, 12A, 12B, 13A, 13B illustrate digital certificate management used in some embodiments of the present disclosure.
Figure 10B:
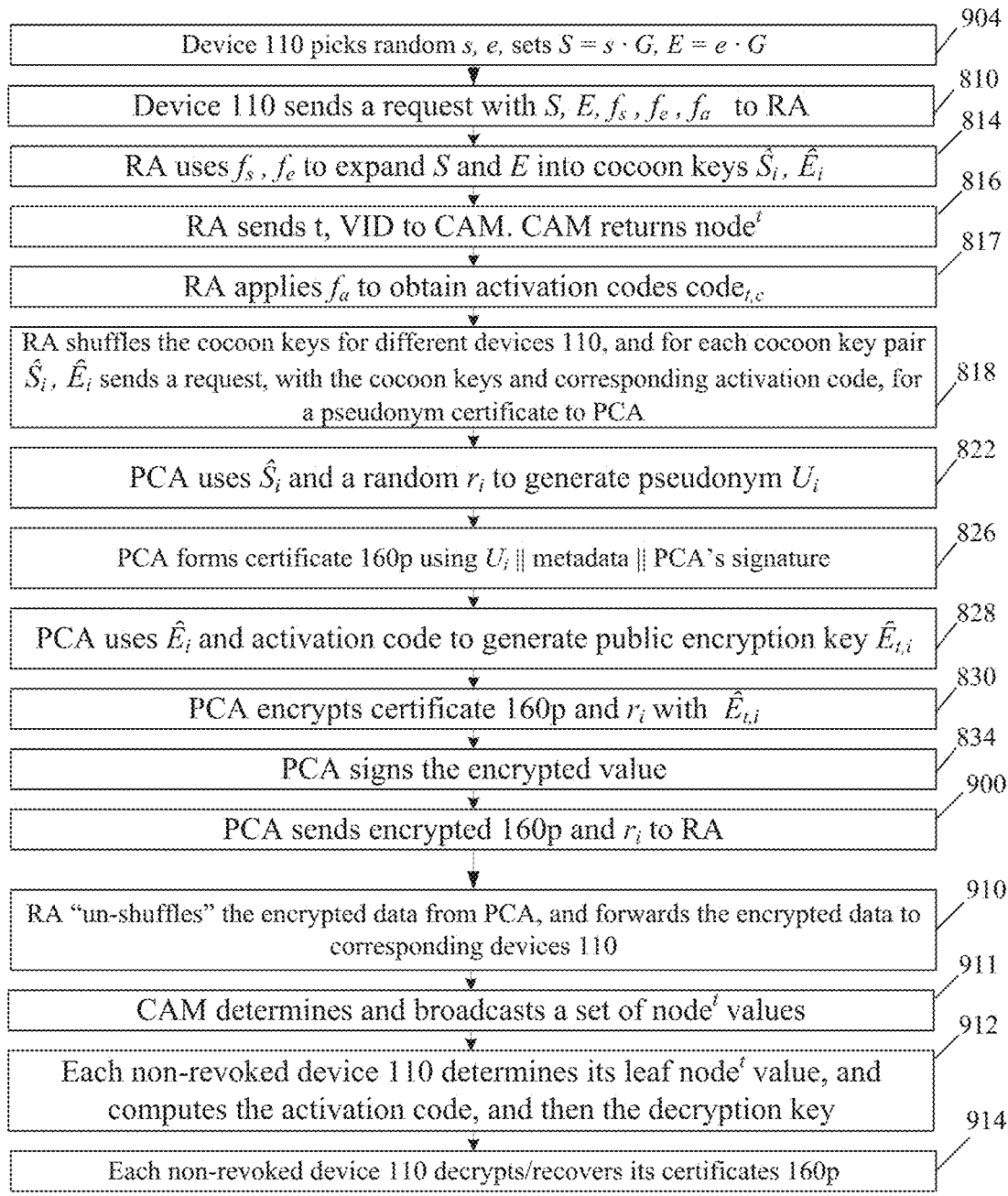

The binary hash trees 840 generated by CAM 838 are employed in the pseudonym certificate issuance process. One example is shown in FIGS. 10A and 10B, based on the explicit certificate issuance process of FIG. 7. FIG. 10A is identical to FIG. 7, except as described below.

When a vehicle (or other entity) with a given VID requests a batch of pseudonym certificates from the RA, the vehicle (through its device 110) provides not only the values (S, F, $f_s$, $f_e$) as in FIG. 7 (see step 904 in FIG. 10B), but also an additional PRF $f_a$, shared only between the vehicle and the RA (steps 810 in FIG. 10B). Actually, $f_a$ may be derived from the same seed as $f_s$, thus avoiding any extra communication overhead; a common approach for doing so is to hash the vehicle-provided seed with different suffixes, and use the results as the actual seeds for each PRF.

At step 814, the RA generates the cocoon keys $\hat{S}_i$ and $\hat{E}_i$ as in FIG. 7.

At step 816, the RA queries the CAM for the corresponding leaf value node$^r$(|VID|, VID) for each time period t covered in the batch, so 0≤t<τ. A single request to the CAM is sufficient for multiple periods t if they are part of a single activation period. The RA's query specifies the time periods t and the VID. The CAM returns node$^r$(|VID|, VID).

At step 817, the RA computes the activation codes $$\text{code}_{t,c} = f_a(\text{node}^r(|VID|, VID), t, c) \quad \text{(Eq. 13)}$$

for each of the σ public keys that will be valid in the time period t, so 0≤c<σ. The activation code code$_{t,c}$ then accompanies $\hat{S}_{t,c}$ in the request sent by the RA to the PCA at step 818. By using $f_a$ to create the activation codes, the RA ensures that they are seen as uncorrelated by the PCA, despite being computed from the same leaf. Therefore, this process preserves the unlinkability among pseudonym certificate requests, even when they come from a same vehicle.

The certificate generation by the PCA, at steps 822 and 826, is as in FIG. 7. (In other embodiments, the certificate generation is as in FIG. 8, or of some other type.)

The certificate encryption incorporates the activation code. Specifically, at step 828, the PCA computes the encryption key as:

$$\hat{E}_{t,i} = F(\text{code}_{t,i}, \hat{E}_i) \cdot G + \hat{E}_i \quad \text{(Eq. 14)}$$

where F is a suitable function, and code$_{t,i}$ is the activation code provided by the RA at step 818. (The PCA does not necessarily know the t and i values.) The function F can be a hash function:

$$\hat{E}_{t,i} = \text{Hash}(\text{code}_{t,i} \| \hat{E}_i) \cdot G + \hat{E}_i \quad \text{(Eq. 15)}$$

The issuing of pseudonym certificate then proceeds as usual: at step 830, the PCA encrypts the certificate, and the $r_i$ value generated at step 822, with the key $\hat{E}_{t,i}$; at step 834, the PCA signs the encrypted value; and at step 900, the PCA sends the result to the RA. The RA un-shuffles the encrypted data and forwards them, together with the corresponding (t,i) values, to corresponding vehicles/devices 110 at step 910. Each device can verify the PCA signature 730 if desired, as in SCMS.

The total overhead of this process when compared with SCMS or eSCMS (eSCMS is described below) is minimal. Namely, no extra information needs to be inserted into the certificates. Hence, the extra processing costs of this process refer basically to: (1) a small piece of data added as input to a hash function when computing $\hat{E}_{t,i}$ per equation (Eq. 15); and (2) some additional bandwidth consumed in the RA-to-PCA requests for delivering $code_{t,i}$. (The invention is not limited to these advantages however.)

As a result of this process, the certificate generated from $\hat{E}_{t,i}$ can only be decrypted if the vehicle also obtains the corresponding $code_{t,i}$. After all, the decryption key is now computed as:

$$\hat{e}_{t,i} = F(code_{t,i}, \hat{E}_i) + s + f_e(t, i) \quad \text{(Eq. 16)}$$

Therefore, to keep a vehicle with an identifier VID, from activating its certificates, it suffices to prevent the vehicle from obtaining its $DSV = node^t(|VID_r|, VID_r)$. Therefore, the CRL entries for that vehicle's certificates do not need to remain in CRLs any longer than one activation period.

Certificate Activation

As shown in FIG. 10B at step 911, some time before each given validity period t (period 165), CAM 838 determines the leaf node indices (depth,count) of the valid vehicles (or other devices), and determines a minimal set of node indices (depth,count) from which the leaf node values (DSVs) can be computed by the vehicles via equations (Eq. 11) and (Eq. 12). The minimal set can be determined as in BCAM for example: each node index in the minimal set is a root of a subtree whose leaves correspond to only honest vehicles.

The CAM then distributes the $node^t$(depth, count) values of the minimal set from the tree 840 corresponding to the relevant t period. These values can be distributed to only the non-revoked vehicles, or can be broadcast to all vehicles. Each $node^t$ value is accompanied by the t and (depth,count) parameters.

At step 912, each non-revoked device 110 computes its leaf $node^t$ value (the DSV) from the values distributed by the CAM at step 911. This computation can be done according to equations (Eq. 11) and (Eq. 12).

Also at step 912, each non-revoked device 110 determines, for each encrypted certificate 160p, the corresponding activation code per equation (Eq. 13), and the decryption key per equation (Eq. 16). At step 914, the device uses the description key to decrypt the certificate.

The remaining steps can be as in SCMS, including the verification of the PCA signature formed at step 826, and determining the device's signature key. These steps are not shown in FIG. 10B.

Some embodiments use the same activation technique with the implicit certificate schemes such as shown in FIG. 8. Steps 904 through 818 and 828 are as in FIG. 10B. The certificate generation steps 822 to 826, and steps 834 to 900, are as in FIG. 8. Steps 910 to 914 are as in FIG. 10B. In some embodiments, the activation codes provide the same or similar advantages for the implicit certificates as for the explicit certificates.

Unified Butterfly Key Expansion Process (eSCMS)

In eSCMS (FIGS. 11A, 11B), the generation and usage of the caterpillar keys 710 is done in a unified manner, leading to better efficiency without loss of security or functionality. Specifically, in some embodiments, the device 110 generates only one caterpillar key pair, (x,X) in FIGS. 11A and 11B, instead of two key pairs (e,E) and (s,S). This caterpillar key pair (x,X) can have the same size as any one of (e,E) and (s,S), and is used to generate both the encryption and signature keys. Both the explicit and the implicit certificate models are eSCMS compatible.

Examples of Explicit Certificate Process in eSCMS

Figure 11A:
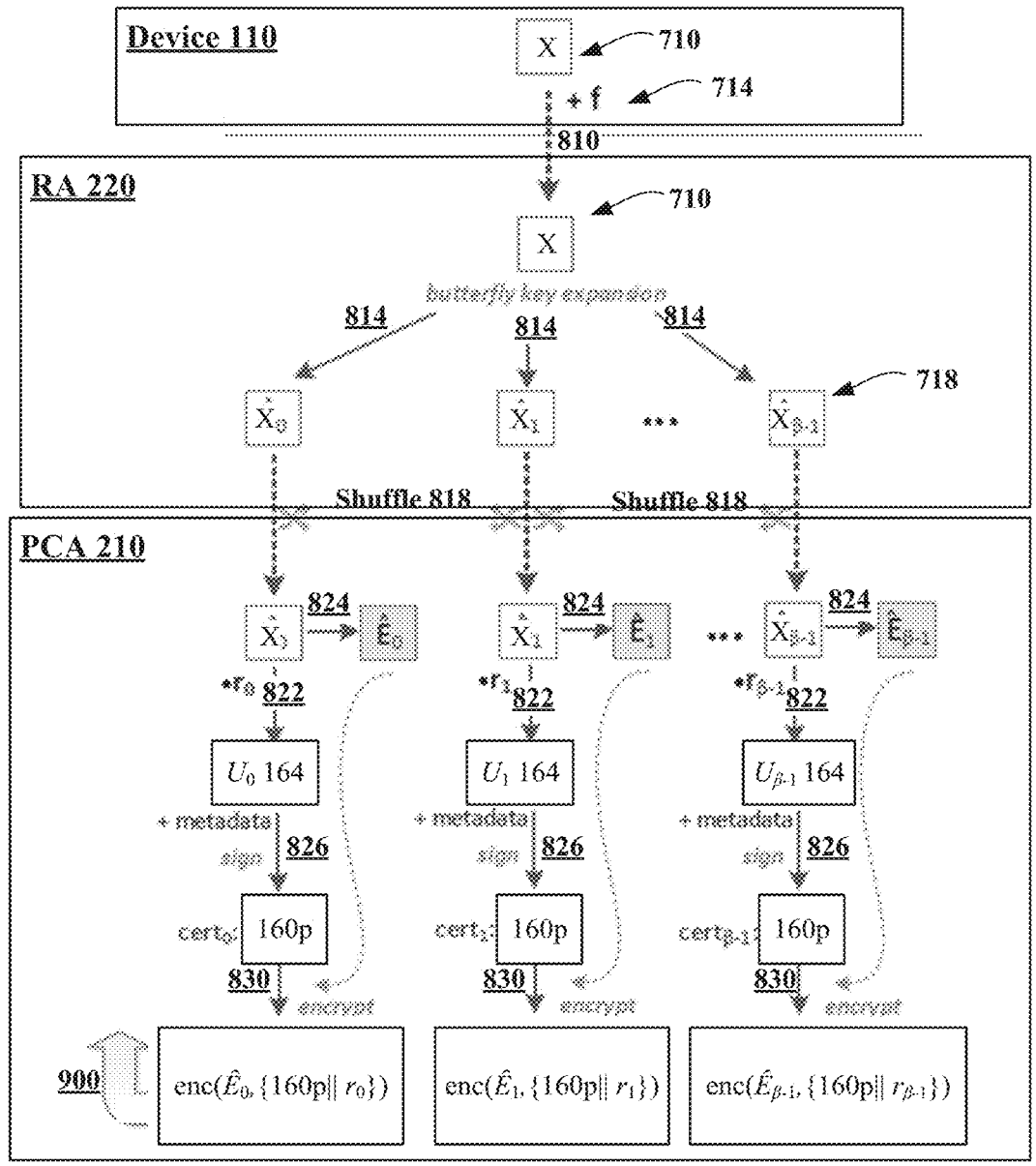
Figure 11B:
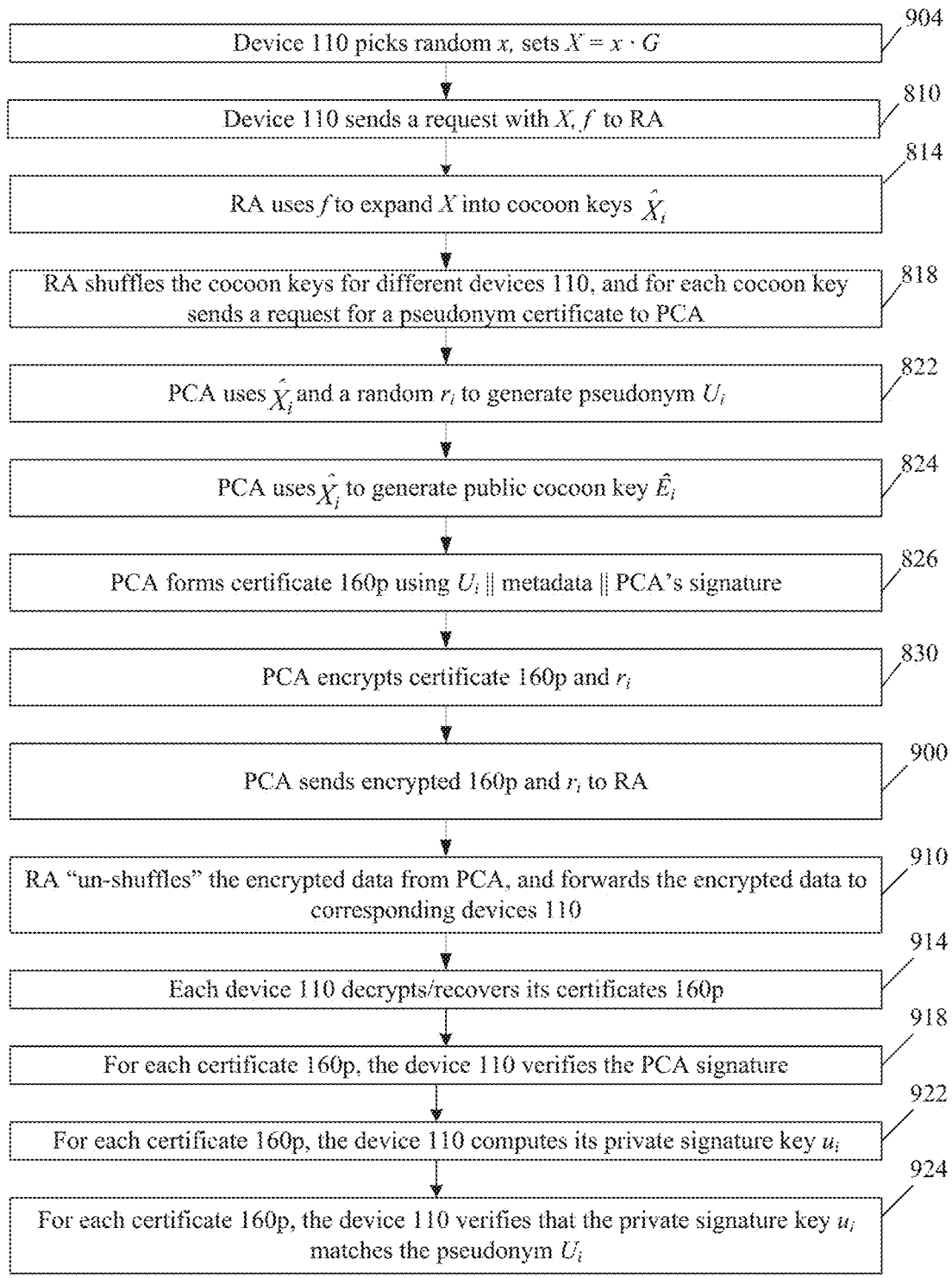

One eSCMS explicit certificate scheme is depicted in FIGS. 11A-B. At step 904, the requesting device 110 generates only a single caterpillar private/public key pair 710: (x, X=x·G). The private key x can be randomly generated. The public key X will be used by the PCA both for encrypting the certificate 160p and for creating the public key or pseudonym 164 for the certificate as described below (step 824).

At step 810, the device 110 requests the RA to generate some predefined number β of pseudonym certificates 160p. The device request sent by the device to the RA includes a unique ID ("device request ID"), a unique device ID (e.g. VID), the public unified caterpillar key X, and data defining a suitable pseudorandom function (PRF) 714, shown simply as $f$. The function $f$ can be the same as $f_s$ or $f_e$ in SCMS. A copy of each device request is stored by the device in its memory.

At step 814, the RA generates β public unified cocoon signature keys for each device (similarly to SCMS):

$$\hat{X}_i = X + f(i) \cdot G \quad \text{(Eq. 17)}$$

At step 818, the RA shuffles these cocoon keys for different devices, and for each cocoon key $\hat{X}_i$ the RA sends a request ("RA request") for a pseudonym certificate 160p to PCA 210. The RA requests for different devices 110 can be sent to the PCA in batch, but this is not necessary.

For each RA request, the RA generates a unique request ID ("RA request ID"), and creates a data structure ("RA request data structure") containing the RA request ID, the cocoon key index i (see equation (Eq. 17)), and the associated device request. The RA request ID is provided to the PCA with the RA request. Also provided are metadata, e.g. the certificate's validity period 165 and the linkage value (lv) 234. The device ID is not provided to the PCA, so the PCA cannot associate the RA request with the device. Also, the PCA cannot determine whether different RA requests are associated with the same or different devices.

For each cocoon key $\hat{X}_i$, the PCA can either create an explicit or implicit pseudonym certificate 160p. FIGS. 11A-B illustrate a process for explicit certificates. In either case, the explicit or implicit certificate 160p will later be encrypted by the PCA and sent to the RA (step 900). Each encrypted pseudonym certificate will be accompanied by the RA request ID, allowing the RA to "un-shuffle" the pseudonym certificates, i.e. associate each encrypted package with the device, and send the encrypted package to the associated device. Optionally, each device's β pseudonym certificates can be sent to the device in batch.

For the explicit certificates, at step 822, the PCA generates a random value $r_i$, and generates the certificate's public signature key (pseudonym) 164 as a randomized function of cocoon key $\hat{X}_i$, i.e. as a function of $\hat{X}_i$ and $r_i$. For example, either one of the following equations (Eq. 18), (Eq. 18') can be used:

$$U_i = \hat{X}_i + r_i \cdot G \quad \text{(Eq. 18)}$$

$$U_i = r_i \cdot \hat{X}_i \quad \text{(Eq. 18')}$$

Also (step 824), the PCA generates a public cocoon encryption key $\hat{E}_i$. In some embodiments, $\hat{E}_i$ is set equal to $\hat{X}_i$, i.e.

$$\hat{E}_i = \hat{X}_i \quad \text{(Eq. 19)}$$

Other expressions for $\hat{E}_i$ can also be used. For example:

$$\hat{E}_i = \text{hash}(\hat{X}_i) \cdot G + \hat{X}_i \quad \text{(Eq. 19')}$$

The remaining steps may or may not be similar to FIG. 7, but generation of the PCA signature 730 can be omitted. Specifically, in some embodiments, at step 826, the PCA forms the certificate 160p, also shown as cert$_i$, by: (1) combining $U_i$ with the metadata, e.g. the certificate's validity period 165 and the linkage value (lv) 234; and (2) digitally signing the combination to form the signature 167 (FIG. 5A).

At step 830, the PCA encrypts the package which includes (possibly consists of) the certificate 160p and the value $r_i$. The encryption uses the corresponding cocoon key $\hat{E}_i$. An exemplary encryption scheme is ECIES; see IEEE, *IEEE Standard Specifications for Public-Key Cryptography—Amendment 1: Additional Techniques*, IEEE Computer Society, 2004, incorporated herein by reference. Other encryption schemes can also be used.

The result, i.e. the encrypted package, is sent to the RA (step 900), together with the RA request ID received by the PCA at step 818. As noted above, signature 730 is omitted. The RA cannot decrypt the package.

The RA "un-shuffles" the data received from the PCA. To perform this operation, the RA matches the RA request ID accompanying each encrypted package with the RA request ID stored in the RA's memory (step 818). The RA forwards to each device 110 the encrypted package for that device (step 910). With each encrypted package, the RA sends to the device the corresponding i value defining the associated cocoon key; see equation (Eq. 17). The RA obtains the i value from the RA request data structure.

At step 914, for each certificate 160p, the associated device 110 computes the decryption key $\hat{e}_i$ corresponding to the encryption (cocoon) key $\hat{E}_i$. If $\hat{E}_i$ was set to equal $\hat{X}_i$ (equation (Eq. 19)), then:

$$\hat{e}_i = x + f(i) \quad \text{(Eq. 20)}$$

In case of equation (Eq. 19'):

$$\hat{e}_i = \text{hash}(\hat{X}_i) + x + f(i) \quad \text{(Eq. 20')}$$

using the same hash function "hash" as was used in equation (Eq. 19').

The device 110 uses the decryption key $\hat{e}_i$ to decrypt the package, and thus recovers the certificate 160p and the corresponding $r_i$. This decryption key works because, in case of equations (Eq. 19), (Eq. 20), the encryption public key is:

$$\hat{E}_i = \hat{X}_i = x \cdot G + f(i) \cdot G$$

In case of equations (Eq. 19'), (Eq. 20'), the decryption works because the encryption public key is:

$$\hat{E}_i = \text{hash}(\hat{X}_i) \cdot G + \hat{X}_i = \text{hash}(\hat{X}_i) \cdot G + x \cdot G + f(i) \cdot G$$

At step 918, the device verifies the PCA signature 167 using the PCA's public signature key $U_{PCA}$.

At step 922, the device computes its private signature key $u_i$ corresponding to $U_i$. If $U_i$ was computed as in equation (Eq. 18), then the private signature key is created as:

$$u_i = r_i + x + f(i) \quad \text{(Eq. 21)}$$

If equation (Eq. 18') was used, then the private signature key is created as:

$$u_i = r_i \cdot (x + f(i)) \quad \text{(Eq. 21')}$$

See (Eq. 18). At step 924, the device verifies that $$u_i \cdot G = U_i \quad \text{(Eq. 22)}$$

If any of the above checks or verifications fails, the device may reject the certificate 160p and/or all the certificates in the batch. The device may also inform pertinent authorities (e.g. misbehaving authority 250) about the error in order to trigger maintenance and/or security operations on malfunctioning or dishonest RA or PCA.

Examples of Implicit Certificate Process in eSCMS

Figure 12A:
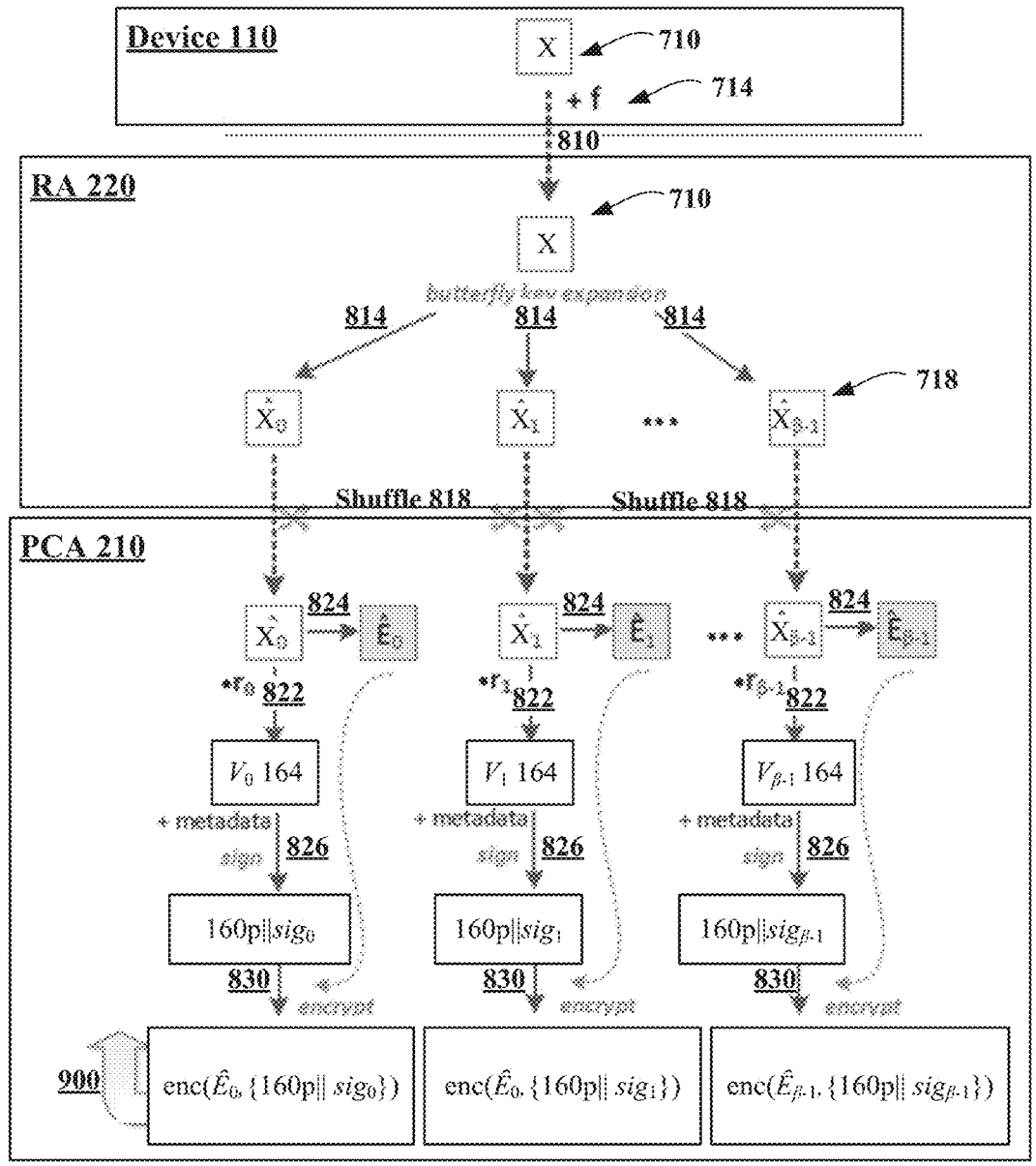
Figure 12B:
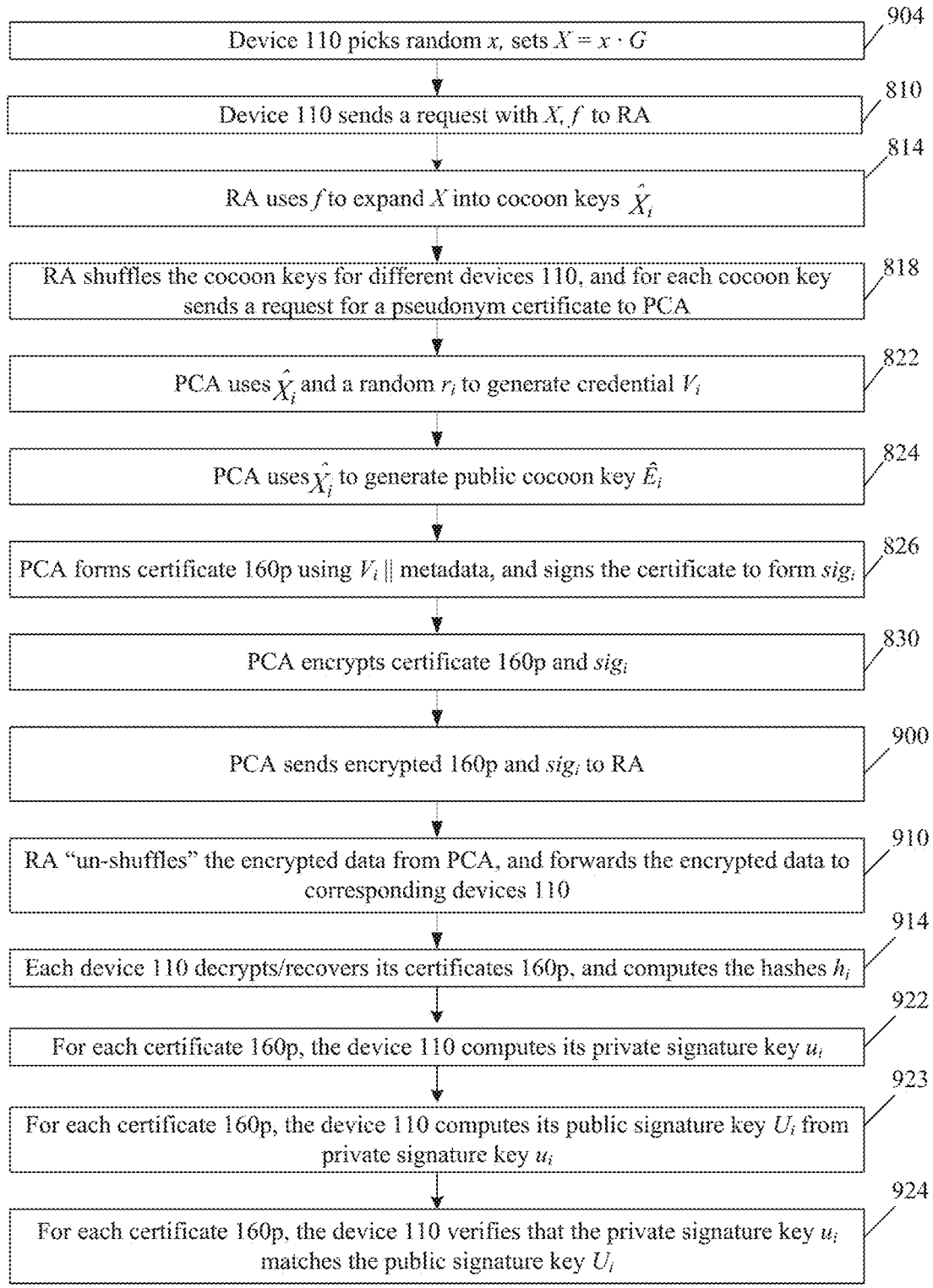

FIGS. 12A, 12B illustrate an implicit certificate scheme. Steps 904, 810, 814, 818 are as in FIGS. 11A-B. Then at step 822, the PCA computes a random $r_i$, and computes a credential 164:

$$V_i = \hat{X}_i + r_i \cdot G$$

At step 824, the PCA generates a public cocoon encryption key $\hat{E}_i$, possibly using the same process as for the explicit certificates, e.g. according to equation (Eq. 19) or (Eq. 19').

At step 826, the PCA creates the implicit certificate 160*p*, also denoted cert$_i$, as:

$$cert_i = (V_i, meta)$$

i.e.

$$cert_i = V_i \| meta$$

where "meta" is the metadata (including validity period 165 etc.).

Also at step 826, the PCA signs this certificate to obtain the signature sig$_i$ as follows:

$$sig_i = h_i \cdot r_i + u_{PCA}$$

where h$_i$=Hash(cert$_i$).

At step 830, the PCA encrypts a package which includes (possibly consists of) the certificate 160*p* and the signature sig$_i$. The encryption uses the corresponding cocoon key $\hat{E}_i$. An exemplary encryption scheme is ECIES, but other schemes can also be used.

At steps 900 and 910, the encrypted package is sent to the requesting device 110 via the RA 220, possibly without being signed by the PCA (signature 730 is omitted), using the same process and data structures (including RA request data structures) as in FIGS. 11A-B. The RA cannot decrypt the package.

At step 914, the device 110 receives the encrypted package and the corresponding value i, computes the private key ê$_i$ as in equation (Eq. 20) or (Eq. 20'), uses this key to decrypt the PCA's response package cert$_i$‖sig$_i$, and then computes:

$$h_i = \text{Hash}(cert_i)$$

At step 922, the device sets its own private signature key to:

$$u_i = h_i \cdot (x + f(i)) + sig_i$$

and computes the corresponding public signature key at step 923 as:

$$U_i = u_i \cdot G$$

The device 110 can then verify the validity of the public key U$_i$ by ascertaining, at step 924, that $$U_i = h_i \cdot V_i + U_{PCA}$$

where U$_{PCA}$ is the PCA's public signature key.

Other features of some embodiments are described in Marcos A. Simplicio Jr. et. al., "The Unified Butterfly Effect: Efficient Security Credential Management System for Vehicular Communications", 2018, Cryptology ePrint Archive: Report 2018/089, https://eprint.iacr.org/2018/089.pdf, incorporated herein by reference.

Integrating Activation Codes into eSCMS
Certificate Issuing Process

In eSCMS, use of activation codes can be similar to SCMS. In particular, each CAM 838 generates a tree 840 for each activation period, or each validity period 165, as in FIG. 9 and equations (Eq. 11) and (Eq. 12). The SCMS discussion above in connection with FIG. 9 applies to eSCMS.

Figure 13A:
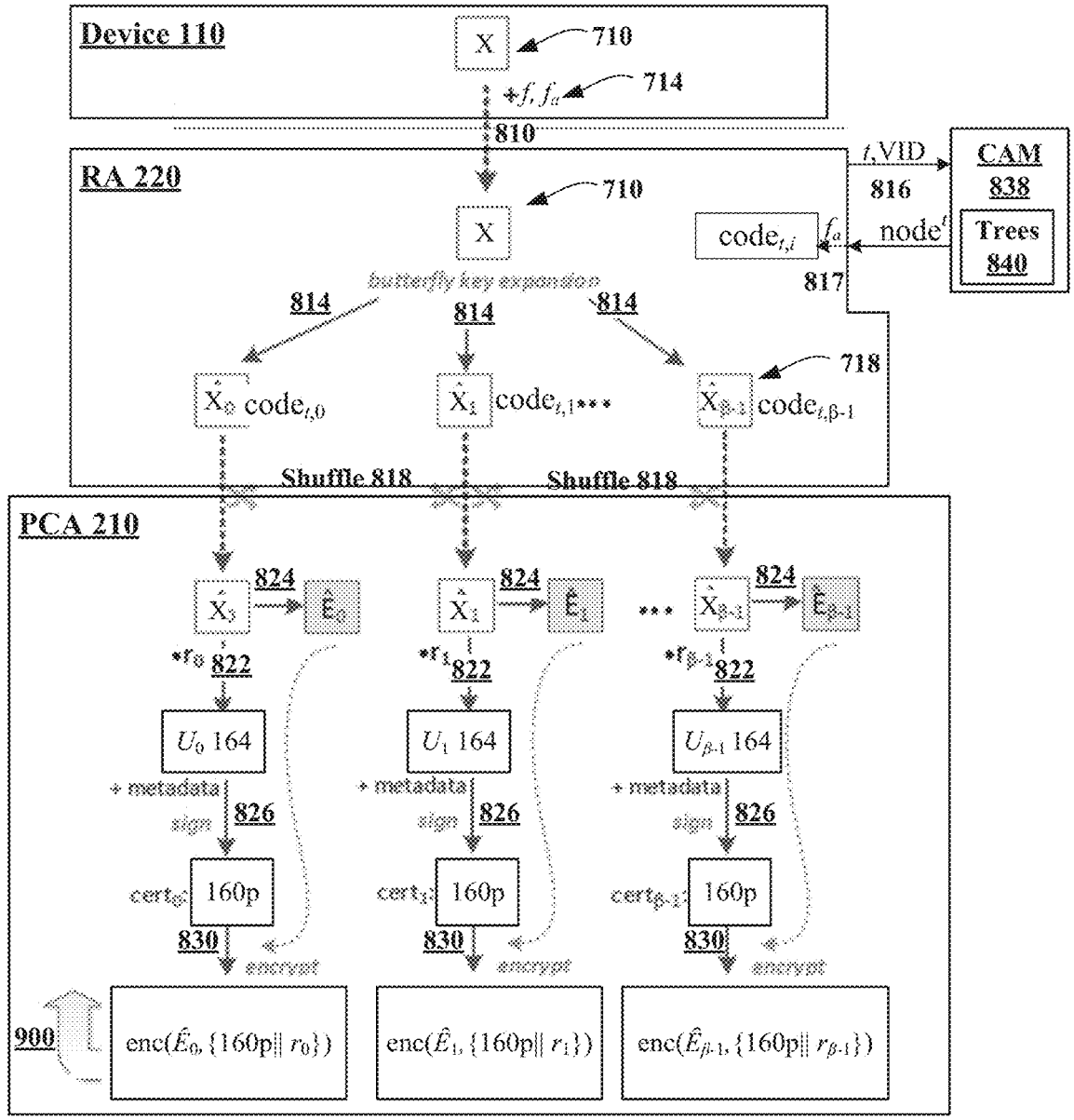
Figure 13B:
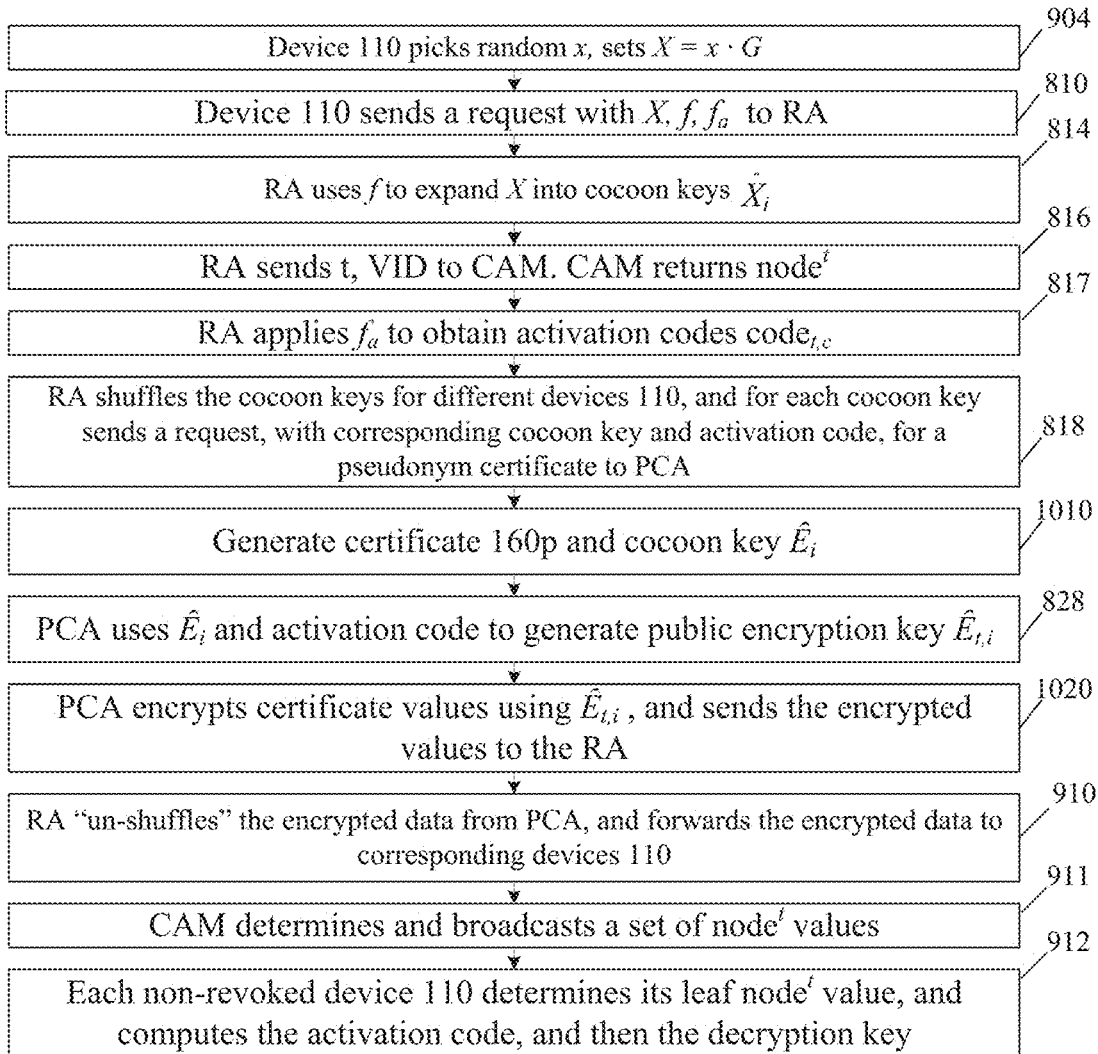

One embodiment of the certificate issuance process is illustrated in FIGS. 13A, 13B. These figures illustrate the explicit certificate process, but a similar process can be used to issue implicit certificates. Step 904—x and X generation—is as in FIG. 11B or 12B. Step 810 is also as in FIG. 11B or 12B, but in addition the device 110 generates and sends to the RA the definition of function $f_a$, same as in FIG. 10B.

Step 814 (cocoon key generation) is as in FIG. 11B or 12B. Steps 816-817 (activation code generation) are as in FIG. 10B. Step 818 is as in FIG. 11B or 12B, but in addition the RA sends to the PCA the corresponding activation code code$_{t,i}$.

Step 1010 of FIG. 13B corresponds to steps 822, 824, 826 of FIGS. 11A-B (explicit certificates) or FIGS. 12A-B (implicit certificates). Specifically, at step 1010, the PCA generates the certificate 160*p* and the cocoon key $\hat{E}_i$.

At step 828, the PCA uses the activation code to generate the public encryption key $\hat{E}_{t,i}$ as in FIGS. 10A-B.

At step 1020, the PCA performs encryption as at step 830 of FIG. 11A-B or 12A-B, but the encryption key is $\hat{E}_{t,i}$. Also at step 1020, the PCA sends the encrypted values to the RA, as in step 900 of FIG. 10A-B or 11A-B or 12A-B.

Step 910—un-shuffling of encrypted data and forwarding of the encrypted data by the RA to the devices 110—is like in FIG. 10A-B, or 11A-B, or 12A-B.

Certificate activation steps 911, 912 can be as in FIG. 10B. The subsequent certificate use can be as at steps 914 to 924 in FIG. 11B or 12B. In some eSCMS embodiments, activation codes provide the same advantages as with SCMS.

The invention is not limited to the embodiments described above. Some embodiments include a method for digital certificate management by entities (such as the RA, PCA, and CAM; the examples in the parentheses below do not limit the invention). Such entities are operable to perform computing on digital values and to communicate with each other (e.g. computer systems as in FIG. 2, possibly distributed computer systems). The digital certificates are for use by devices (e.g. 110) in authentication operations, each device being one of the entities. The digital certificates may or may not be pseudonym certificates (like 160*p*). Each digital certificate is to be activated by an activation code (e.g. code$_{t,c}$) associated with the digital certificate. The method comprises:

receiving, by a first entity (e.g. the RA), one or more device requests from one or more devices, each device request requesting one or more digital certificates for the associated device (note step 810 for example);

for each device request, performing operations of:

obtaining by the first entity, using information on the associated device (e.g. using VID or some other information), first activation data (e.g. node$^r$(|VID|, VID)) associated with the device;

generating, by the first entity, one or more certificate generation requests, each certificate generation request comprising associated certificate activation data (e.g. $code_{t,c}$; see equation (Eq. 13) and step 817) generated from the first activation data;

sending to a certificate authority (CA, possibly PCA if the certificates are pseudonym certificates), by the first entity, each certificate generation request (e.g. at step 818), wherein the CA is unable to link the certificate generation request to the associated device, and at least one of the (a) and (b) is true:

the CA is unable to link the certificate activation data in the certificate generation request to the associated first activation data;

the one or more certificate generation requests are a plurality of certificate generation requests, and the CA is unable to link the certificate activation data in the different certificate generation requests to each other.

These conditions can be fulfilled, for example, by using the $f_a$ PRF described above.

In some embodiments, (a) is true for each device request.

In some embodiments, (b) is true for each device request.

Some embodiments provide a method for digital certificate management by entities operable to perform computing on digital values and to communicate with each other, the digital certificates being for use by devices in authentication operations, each device being one of the entities, wherein each digital certificate is to be activated by an activation code associated with the digital certificate, the method comprising:

receiving, by a first entity (e.g. RA), one or more device requests from one or more devices, each device request requesting one or more digital certificates for the associated device, each device request comprising the associated device's public key data (e.g. X, E, S) but not the associated device's private key data (e.g. x, e, s) corresponding to the public key data;

for each device request, performing operations of:

obtaining by the first entity, using information on the associated device, first activation data (e.g. $node^r$ (|VID|, VID)) associated with the device;

generating, from the device's public key data, a plurality of first public key data (e.g. cocoon keys at step 818), each first public key data being for use in encrypting an associated digital certificate to be generated;

generating by the first entity, for each digital certificate to be generated, a certificate generation request comprising the associated first public key data and associated certificate activation data, the associated certificate activation data being an output of a pseudorandom function (e.g., $f_a$, or a combination of $f_a$ with some other operations) applied to the first activation data and to a parameter value associated with the certificate generation request;

sending to a certificate authority (CA), by the first entity, each certificate generation request, without providing, to the CA, any of: the information on the device, the first activation data, the associated parameter value.

The method further comprises, for each certificate generation request, generating, by the CA, a digital encrypted package (e.g. at steps 822 through 830) which is an encryption of a digital package comprising an associated digital certificate which is recoverable from the encrypted package using an activation code associated with the certificate activation data (e.g. the certificate activation data and the activation code can be the same value $code_{t,c}$).

In some embodiments, generating the digital encrypted package comprises:

generating the digital package by the CA;

generating an encryption key as dependent on the first public key data and certificate activation data in the certificate generation request;

encrypting the digital package under the encryption key.

In some embodiments, the method further comprises, for each certificate generation request:

receiving, by the associated device, the encrypted package and the associated parameter value;

obtaining, by the associated device, the activation code;

generating, by the associated device, a decryption key from: the device's private key data, the associated parameter value, and the activation code;

decrypting the encrypted package under the decryption key. For example, see step 912.

In some embodiments, the second entity and the CA together are unable to link the first activation data to any associated certificate activation data. For example, in some embodiments described above, due to the use of PRF $f_a$, even if the PCA and CAM collude, they are unable to link $node^r$ to the activation codes $code_{t,c}$.

In some embodiments, the first activation data is provided to the first entity by a second entity in response to the second entity receiving the information on the device from the first entity. In some embodiments, the second entity and the CA together are unable to link the first activation data to any associated certificate activation data.

In some embodiments, the method is repeated a plurality of times to generate certificates with different validity periods, and the first activation data are different for at least one device for at least two of the validity periods.

Some embodiments further comprise:

Sending, by the CA, each encrypted package to the first entity (e.g. at step 900);

forwarding, by the first entity, each encrypted package to the associated device, wherein the first entity is unable to decrypt any encrypted package.

Some embodiments further comprise, for at least one device:

receiving, by the device, an encrypted package;

then obtaining, by the device, the associated activation code; and recovering, by the device the associated digital certificate by using the activation code.

In some embodiments, for each certificate, the associated activation code is the same as the associated certificate activation data.

In some embodiments, obtaining, by the device, the associated activation code comprises:

receiving, by the device, the associated first activation data; and generating, by the device, the associated activation code from the associated first activation data using a pseudorandom function.

In some embodiments, recovering the associated digital certificate is performed using by the device, in addition to the activation code, a private key (e.g. e or x) unavailable to the first entity, unavailable to the second entity, and unavailable to the CA.

Other embodiments are within the scope of the invention, as defined by the appended claims.

Some embodiments are defined by the following clauses:

Clause 1 defines a method for digital certificate management by entities operable to perform computing on digital values and to communicate with each other, the digital certificates being for use by devices in authentication operations, each device being one of the entities, wherein each digital certificate is to be activated by an activation code associated with the digital certificate, the method comprising:

receiving, by a first entity, one or more device requests from one or more devices, each device request requesting one or more digital certificates for the associated device;

for each device request, performing operations of:

obtaining by the first entity, using information on the associated device, first activation data associated with the device;

generating, by the first entity, one or more certificate generation requests, each certificate generation request comprising associated certificate activation data generated from the first activation data;

sending to a certificate authority (CA), by the first entity, each certificate generation request, wherein the CA is unable to link the certificate generation request to the associated device, and at least one of the (a) and (b) is true:

the CA is unable to link the certificate activation data in the certificate generation request to the associated first activation data;

the one or more certificate generation requests are a plurality of certificate generation requests, and the CA is unable to link the certificate activation data in the different certificate generation requests to each other;

wherein the CA is operable to generate, from each certificate generation request, a digital encrypted package which is an encryption of a digital package comprising an associated digital certificate which is recoverable from the encrypted package using an activation code associated with the certificate activation data.

2. The method of clause 1 wherein (a) is true for each device request.

3. The method of clause 1 wherein (b) is true for each device request.

4. A method for digital certificate management by entities operable to perform computing on digital values and to communicate with each other, the digital certificates being for use by devices in authentication operations, each device being one of the entities, wherein each digital certificate is to be activated by an activation code associated with the digital certificate, the method comprising:

receiving, by a first entity, one or more device requests from one or more devices, each device request requesting one or more digital certificates for the associated device, each device request comprising the associated device's public key data but not the associated device's private key data corresponding to the public key data;

for each device request, performing operations of:

obtaining by the first entity, using information on the associated device, first activation data associated with the device;

generating, from the device's public key data, a plurality of first public key data, each first public key data being for use in encrypting an associated digital certificate to be generated;

generating by the first entity, for each digital certificate to be generated, a certificate generation request comprising the associated first public key data and associated certificate activation data, the associated certificate activation data being an output of a pseudorandom function applied to the first activation data and to a parameter value associated with the certificate generation request;

sending to a certificate authority (CA), by the first entity, each certificate generation request, without providing, to the CA, any of: the information on the device, the first activation data, the associated parameter value;

wherein the CA is operable to generate, from each certificate generation request, a digital encrypted package which is an encryption of a digital package comprising an associated digital certificate which is recoverable from the encrypted package using an activation code associated with the certificate activation data.

5. The method of any one of clauses 1 through 4, further comprising, for each certificate generation request, generating, by the CA, a digital encrypted package which is an encryption of a digital package comprising an associated digital certificate which is recoverable from the encrypted package using an activation code associated with the first activation data;

wherein generating the digital encrypted package comprises:

generating the digital package;

generating an encryption key as dependent on the first public key data and certificate activation data in the certificate generation request;

encrypting the digital package under the encryption key.

6. The method of clause 5 further comprising, for each certificate generation request:

receiving, by the associated device, the encrypted package and the associated parameter value;

obtaining, by the associated device, the activation code;

generating, by the associated device, a decryption key from: the device's private key data, the associated parameter value, and the activation code;

decrypting the encrypted package under the decryption key.

7. The method of any one of clauses 1 through 6, wherein the first activation data is provided to the first entity by a second entity in response to the second entity receiving the information on the device from the first entity.

8. The method of clause 7 wherein the second entity and the CA together are unable to link the first activation data to any associated certificate activation data.

9. The method of any one of clauses 1 through 8, wherein the method is repeated a plurality of times to generate certificates with different validity periods, and the first activation data are different for at least one device for at least two of the validity periods.

10. The method of any one or more of clauses 1 through 9, further comprising:

sending, by the CA, each encrypted package to the first entity;

forwarding, by the first entity, each encrypted package to the associated device, wherein the first entity is unable to decrypt any encrypted package.

11. The method of any one of clauses 1 through 10, further comprising, for at least one device:

receiving, by the device, an encrypted package;

then obtaining, by the device, the associated activation code; and recovering, by the device the associated digital certificate by using the activation code.

12. The method of any one of clauses 1 through 11, wherein for each certificate, the associated activation code is the same as the associated certificate activation data.

13. The method of any one of clauses 1 through 12, wherein said obtaining, by the device, the associated activation code comprises:
   receiving, by the device, the associated first activation data; and
   generating, by the device, the associated activation code from the associated first activation data using a pseudorandom function.

14. The method of clause 11, 12, or 13, wherein:
   the first activation data is provided to the first entity by a second entity in response to the second entity receiving the information on the device from the first entity; and
   recovering the associated digital certificate is performed using by the device, in addition to the activation code, a private key unavailable to the first entity, unavailable to the second entity, and unavailable to the CA.

15. A first device operable to perform computing on digital values and to wirelessly communicate with other entities, the first device being configured to perform as a device in a method according to any one or more of clauses 1 through 14.

16. A computer readable medium comprising computer instructions operable to cause one or more computer processors to operate as the first device of clause 14.

17. A digital certificate management entity operable to perform computing on digital values and to communicate with other entities, the digital certificate management entity being configured to perform as a first entity in a method according to any one or more of clauses 1 through 14.

18. A digital certificate management entity operable to perform computing on digital values and to communicate with other entities, the digital certificate management entity being configured to perform as the second entity providing the first activation data to the first entity in a method according to any one or more of clauses 7 through 14.

19. A digital certificate management entity operable to perform computing on digital values and to communicate with other entities, the digital certificate management entity being configured to perform as a certificate authority in a method according to any one or more of clauses 1 through 14.

20. A computer readable medium comprising computer instructions operable to cause one or more computer processors to operate as the digital certificate management entity of any one or more of clauses 17 through 19.

APPENDIX

Birthday Attack Against BCAM's Hash Trees

The structure of BCAM's binary hash trees is such that their k-bit nodes are computed via iterative hashing, using a constant suffix for each branch. More precisely, starting from a random root $node^r(0,0)$, each node $node^r$(depth, count) of $tree^r$ is computed from its parent as follows:

$$node^r(\text{depth, count}) = \text{Hash}(node^r(\text{depth} - 1, \lfloor \text{count}/2 \rfloor) \| b^p),$$

where b=0 (resp.b=1) if the node is a left (resp. right) child, and p≥1 is a suitable padding length. For example, when k=256 and the hash function employed is SHA-256, adopting 1≤p<192 would allow the underlying compression function to be called only once when computing any node of the tree.

Suppose that a vehicle with identifier $VID_r$ is revoked. In that case, the leaf $node^r$ ($|VID_r|$, $VID_r$) should not be computed from the message broadcast by the CAM, for every future value of 1. This means that the set $N_r$ of all nodes in the path between the root and that leaf must remain secret. To accomplish this, the CAM only broadcasts children of the nodes in $N_r$. For example, as mentioned in Section III-A2, the revocation of $node^r$ (3,4) leads to the disclosure of the set $N_d$={$node^r$ (1,0), $node^r$ (2,3), $node^r$ (3,5)}. As long as the tree is built using a secure hash function, it is not straightforward to use any node in $N_d$ to compute nodes in the set $N_r$={$node^r$ (0,0), $node^r$ (1,1), $node^r$ (2,2), $node^r$ (3,4)}. Indeed, doing so corresponds to finding pre-images for nodes in the set $N_d$.

To overcome the security of BCAM's activation trees, the following attack strategy can be employed to recover activation codes for revoked vehicles. First, the attacker picks an arbitrary k-bit long $link^0$, and arbitrarily chooses between b=0 or b=1. The value of $link^0$ is then used as the anchor for a hash chain of the form $link^j$=Hash($link^{j-1}\|b^p$), until $2^n$ hashes are performed. For simplicity, we assume that no collision occurs during this process, i.e., that $link^j \neq link^{j'}$ for all j≠j'. Nevertheless, this simplification comes without loss of generality because, whenever there is a collision, the attacker could simply (1) save the current chain, (2) pick a new anchor distinct from any previously computed $link^j$, and then (3) start a new chain from this anchor. Actually, picking different anchors for building multiple chains is likely advantageous anyway, because this facilitates the parallel processing of hashes. As long as $2^n$ different hashes are made available in this manner, the attack can proceed.

Due to the birthday paradox, an attacker that gathers $2^m$ nodes disclosed by the CAM has a high probability to find a match between at least one of those nodes and some of the $2^n$ previously computed $link^j$ if m+n≥k. Suppose that a match occurs between $link^j$ and $node^r$ (depth, count). In this case, $link^{j-1}$ is a valid pre-image for $node^r$ (depth, count) with padding $b^p$. Hence, if the attacker picked b=0 and $node^r$ (depth, count) is a left child, it is very likely that $link^{j-1}$ will match the parent of $node^r$ (depth, count) in the activation tree—unless $link^{j-1}$ is a second pre-image rather than the actual pre-image. If the parent of $node^r$ (depth, count) is also a left child, its own parent is also likely to match $link^{j-2}$, and so forth. An analogous argument applies if b=1 and $node^r$ (depth, count) is a right child. As a result, such collisions have roughly 50% of chance of giving the attacker access to nodes belonging to the revoked set $N_r$. All certificates whose revocation depended on those nodes can then be activated.

Considering this attack scenario, the growth of the number of revoked devices has two negative effects on the system's security. First, the recovery of one node from the set $N_r$ becomes more likely to give access to activation codes of multiple revoked devices. The reason is that a node in a given position of the tree always allow the computation of a same number of leafs (the lower the depth, the higher this number). When the number of revoked devices increase, so does the number of leaves covered by that node that should remain concealed to prevent the corresponding activation codes from being recovered. Second, the number of nodes disclosed by the CAM that would lead to useful collisions also grows, i.e., the value of m becomes larger.

Since such attacks trade time for space, one possible defense strategy is to adopt a large enough k parameter. For example, the authors of BCAM suggest k=256 (cf. [16], Section 4.1.3), meaning that the attacker would have to compute, say, $2^n=2^{128}$ hashes and then gather $2^m=2^{128}$ nodes from the CAM before a collision actually occurs. Therefore, in practice, the attacks hereby described do not pose an actual security threat to BCAM. Nevertheless, there is a more efficient defense strategy for this issue, originally discussed by Leighton and Micali [19] in the context of hash-based signatures [20]: to use a different suffix for each node computation. This strategy comes from the observation that collisions between $link^j$ and $node^t$ (depth, count) are useless if they are computed with different suffixes. After all, in that case $link^{j-1}$ will not match the parent of $node^t$ (depth, count), i.e., it will necessarily be second pre-image rather than the actual pre-image of that node. At the same time, attackers are unable to gather more than 1 value of $node^t$ (depth, count) for a given suffix. Consequently, to obtain a high probability of collisions for that suffix, the attacker would have to build a table with $2^n=2^{k-m}=2^k$ entries. In other words, this approach leads to a system with a 128-bit security level when the nodes themselves are 128-bit long.

The invention claimed is:

1. A method for management of digital certificates for use in authentication operations, the method comprising:
   receiving by a registration authority (RA) one or more certificate requests from one or more end entities belonging to a group, wherein each end entity in the group is assigned a node value corresponding to a node of a binary hash tree, wherein a unified butterfly key mechanism is used for the one or more certificate requests;
   wherein each certificate request includes butterfly key mechanism parameters and requests one or more digital certificates for a respective end entity, wherein the same butterfly key mechanism parameters are used to generate a butterfly signing key associated with a digital certificate and a cocoon encryption key used to encrypt the digital certificate on issuance, wherein each digital certificate cannot be used until activated by an activation code corresponding to a respective node of the binary hash tree; and
   managing by the RA the generation of the digital certificates for a plurality of time periods;
   wherein for a given time period, a certificate access manager (CAM) generates activation codes using the binary hash tree.

2. The method of claim 1, wherein each activation code is specific to a particular end entity.

3. The method of claim 1, comprising passing to a certificate authority (CA), by the RA, each certificate generation request, wherein the CA is unable to link the certificate generation request to the associated entity.

4. The method of claim 1, comprising obtaining by the RA from the CAM the node value assigned to each end entity in the group.

5. The method of claim 1, comprising sending to a certificate authority (CA), by the RA, each certificate request.

6. The method of claim 5, wherein the CA is unable to link the certificate generation request to the associated entity.

7. The method of claim 5, wherein the CA is operable to generate, for each certificate request, an encrypted package comprising an associated digital certificate which can be activated by an entity using a respective activation code.

8. The method of claim 7, wherein the entity recovers the associated digital certificate from the encrypted package using the respective activation code.

9. The method of claim 1, wherein the nodes of the binary hash tree are organized in a plurality of layers, wherein the plurality of layers comprises a bottom layer.

10. The method of claim 9, wherein each node in every layer except the bottom layer acts as a parent node for two nodes in the layer.

11. The method of claim 7, wherein the RA is unable to decrypt any encrypted package.

12. The method of claim 7, comprising forwarding, by the RA, each encrypted package to the respective entity.

13. A system for management of digital certificates for use in authentication operations, the system comprising:
   a processor; and
   a memory storing a plurality of instructions, wherein the instructions when executed by the processor cause the system to:
   receive by a registration authority (RA) one or more certificate requests from one or more end entities belonging to a group, wherein each end entity in the group is assigned a node value corresponding to a node of a binary hash tree, wherein a unified butterfly key mechanism is used for the one or more certificate requests;
   wherein each certificate request includes butterfly key mechanism parameters and requests one or more digital certificates for a respective end entity, wherein the same butterfly key mechanism parameters are used to generate a butterfly signing key associated with a digital certificate and a cocoon encryption key used to encrypt the digital certificate on issuance, wherein each digital certificate cannot be used until activated by an activation code corresponding to a respective node of the binary hash tree; and
   manage by the RA the generation of the digital certificates for a plurality of time periods;
   wherein for a given time period, a certificate access manager (CAM) generates activation codes using the binary hash tree.

14. The system of claim 13, wherein each activation code is specific to a particular end entity.

15. The system of claim 13, wherein the instructions when executed by the processor cause the system to pass to a certificate authority (CA), by the RA, each certificate generation request, wherein the CA is unable to link the certificate generation request to the associated entity.

16. The system of claim 13, wherein the instructions when executed by the processor cause the system to obtain by the RA from the CAM the node value assigned to each end entity in the group.

17. The system of claim 13, wherein the instructions when executed by the processor cause the system to send to a certificate authority (CA), by the RA, each certificate request.

18. The system of claim 17, wherein the CA is unable to link the certificate generation request to the associated entity.

19. The system of claim 17, wherein the CA is operable to generate, for each certificate request, an encrypted package comprising an associated digital certificate which can be activated by an entity using a respective activation code.

20. The system of claim 19, wherein the entity recovers the associated digital certificate from the encrypted package using the respective activation code.

21. The system of claim 13, wherein the nodes of the binary hash tree are organized in a plurality of layers, wherein the plurality of layers comprises a bottom layer.

22. The system of claim 21, wherein each node in every layer except the bottom layer acts as a parent node for two nodes in the layer.

23. The system of claim 19, wherein the RA is unable to decrypt any encrypted package.

24. The system of claim 19, wherein the instructions when executed by the processor cause the system to forward, by the RA, each encrypted package to the respective entity.

* * * * *